(12) United States Patent
Gillett, Jr. et al.

(10) Patent No.: US 8,417,746 B1
(45) Date of Patent: Apr. 9, 2013

(54) FILE SYSTEM MANAGEMENT WITH ENHANCED SEARCHABILITY

(75) Inventors: Richard B. Gillett, Jr., Westford, MA (US); Michael A. Berger, Manchester, NH (US); Jonathan C. Nicklin, Cambridge, MA (US); Bradley E. Cain, Groton, MA (US)

(73) Assignee: F5 Networks, Inc., Seattle, WA (US)

( * ) Notice: Subject to any disclaimer, the term of this patent is extended or adjusted under 35 U.S.C. 154(b) by 121 days.

(21) Appl. No.: 11/732,492

(22) Filed: Apr. 2, 2007

Related U.S. Application Data

(60) Provisional application No. 60/788,851, filed on Apr. 3, 2006.

(51) Int. Cl.
*G06F 17/30* (2006.01)

(52) U.S. Cl.
USPC .......................................................... 707/829

(58) Field of Classification Search .................. 707/200, 707/829
See application file for complete search history.

(56) References Cited

U.S. PATENT DOCUMENTS

| | | | |
|---|---|---|---|
| 4,993,030 A | 2/1991 | Krakauer et al. |
| 5,218,695 A | 6/1993 | Noveck et al. |
| 5,303,368 A | 4/1994 | Kotaki |
| 5,473,362 A | 12/1995 | Fitzgerald et al. |
| 5,511,177 A | 4/1996 | Kagimasa et al. |
| 5,537,585 A | 7/1996 | Blickenstaff et al. |
| 5,548,724 A | 8/1996 | Akizawa et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,623,490 A | 4/1997 | Richter et al. |

(Continued)

FOREIGN PATENT DOCUMENTS

| | | |
|---|---|---|
| AU | 2003300350 A1 | 7/2004 |
| CA | 2080530 A1 | 4/1994 |

(Continued)

OTHER PUBLICATIONS

Apple, Inc. "Tiger Developer Overview Series: Working with Spotlight" Nov. 23, 2004, www.apple.com using www.archive.org <http://web.archive.org/web/20041123005335/developer.apple.com/macosx/tiger/spotlight.html>, pp. 1-6.*

(Continued)

*Primary Examiner* — Amresh Singh
(74) *Attorney, Agent, or Firm* — LeClairRyan, a Professional Corporation

(57) ABSTRACT

A primary (e.g., master) file system stores multiple files and corresponding metadata. A view generator function receives template information (e.g., view configuration information) specifying types of metadata information associated with the multiple files stored in the primary file system. Based on processing of the metadata information in the primary file system as specified by the template information, the generator function produces metadata for inclusion in a secondary file system, which is used to satisfy search inquiries associated with the multiple files stored in the primary file system. According to one arrangement, the generator function replicates metadata information in the primary file system as specified by the template information for inclusion in the secondary file system. The secondary file system can include metadata from other sources as well that produced by the generator function. The secondary file system enables more efficient handling of search inquiries than applying search inquiries to the master file system.

42 Claims, 19 Drawing Sheets

U.S. PATENT DOCUMENTS

| | | | |
|---|---|---|---|
| 5,649,194 A | 7/1997 | Miller et al. | |
| 5,649,200 A | 7/1997 | Leblang et al. | |
| 5,668,943 A | 9/1997 | Attanasio et al. | |
| 5,692,180 A | 11/1997 | Lee | |
| 5,721,779 A | 2/1998 | Funk | |
| 5,724,512 A | 3/1998 | Winterbottom | |
| 5,806,061 A | 9/1998 | Chaudhuri et al. | |
| 5,832,496 A | 11/1998 | Anand et al. | |
| 5,832,522 A | 11/1998 | Blickenstaff et al. | |
| 5,838,970 A | 11/1998 | Thomas | |
| 5,862,325 A | 1/1999 | Reed et al. | |
| 5,884,303 A | 3/1999 | Brown | |
| 5,893,086 A | 4/1999 | Schmuck et al. | |
| 5,897,638 A | 4/1999 | Lasser et al. | |
| 5,905,990 A | 5/1999 | Inglett | |
| 5,917,998 A | 6/1999 | Cabrera et al. | |
| 5,920,873 A | 7/1999 | Van Huben et al. | |
| 5,937,406 A | 8/1999 | Balabine et al. | |
| 5,991,302 A | 11/1999 | Berl et al. | |
| 5,995,491 A | 11/1999 | Richter et al. | |
| 5,999,664 A | 12/1999 | Mahoney et al. | |
| 6,012,083 A | 1/2000 | Savitzky et al. | |
| 6,029,168 A | 2/2000 | Frey | |
| 6,044,367 A | 3/2000 | Wolff | |
| 6,047,129 A | 4/2000 | Frye | |
| 6,072,942 A | 6/2000 | Stockwell et al. | |
| 6,078,929 A | 6/2000 | Rao | |
| 6,085,234 A | 7/2000 | Pitts et al. | |
| 6,088,694 A | 7/2000 | Burns et al. | |
| 6,104,706 A | 8/2000 | Richter et al. | |
| 6,128,627 A | 10/2000 | Mattis et al. | |
| 6,128,717 A | 10/2000 | Harrison et al. | |
| 6,161,145 A | 12/2000 | Bainbridge et al. | |
| 6,161,185 A | 12/2000 | Guthrie et al. | |
| 6,181,336 B1 | 1/2001 | Chiu et al. | |
| 6,202,156 B1 | 3/2001 | Kalajan | |
| 6,223,206 B1 | 4/2001 | Dan et al. | |
| 6,233,648 B1 | 5/2001 | Tomita | |
| 6,237,008 B1 | 5/2001 | Beal et al. | |
| 6,256,031 B1 | 7/2001 | Meijer et al. | |
| 6,282,610 B1 | 8/2001 | Bergsten | |
| 6,289,345 B1 | 9/2001 | Yasue | |
| 6,308,162 B1 | 10/2001 | Ouimet et al. | |
| 6,324,581 B1 | 11/2001 | Xu et al. | |
| 6,339,785 B1 | 1/2002 | Feigenbaum | |
| 6,349,343 B1 | 2/2002 | Foody et al. | |
| 6,374,263 B1 | 4/2002 | Bunger et al. | |
| 6,389,433 B1 | 5/2002 | Bolosky et al. | |
| 6,393,581 B1 | 5/2002 | Friedman et al. | |
| 6,397,246 B1 | 5/2002 | Wolfe | |
| 6,412,004 B1 | 6/2002 | Chen et al. | |
| 6,438,595 B1 | 8/2002 | Blumenau et al. | |
| 6,466,580 B1 | 10/2002 | Leung | |
| 6,469,983 B2 | 10/2002 | Narayana et al. | |
| 6,477,544 B1 | 11/2002 | Bolosky et al. | |
| 6,487,561 B1 | 11/2002 | Ofek et al. | |
| 6,493,804 B1 | 12/2002 | Soltis et al. | |
| 6,516,350 B1 | 2/2003 | Lumelsky et al. | |
| 6,516,351 B2 | 2/2003 | Borr | |
| 6,549,916 B1 | 4/2003 | Sedlar | |
| 6,553,352 B2 | 4/2003 | Delurgio et al. | |
| 6,556,997 B1 | 4/2003 | Levy | |
| 6,556,998 B1 | 4/2003 | Mukherjee et al. | |
| 6,560,230 B1 | 5/2003 | Li et al. | |
| 6,601,101 B1 | 7/2003 | Lee et al. | |
| 6,606,663 B1 | 8/2003 | Liao et al. | |
| 6,612,490 B1 | 9/2003 | Herrendoerfer et al. | |
| 6,654,346 B1 | 11/2003 | Mahalingaiah et al. | |
| 6,721,794 B2 | 4/2004 | Taylor et al. | |
| 6,728,265 B1 | 4/2004 | Yavatkar et al. | |
| 6,738,357 B1 | 5/2004 | Richter et al. | |
| 6,738,790 B1 | 5/2004 | Klein et al. | |
| 6,742,035 B1 | 5/2004 | Zayas et al. | |
| 6,744,776 B1 | 6/2004 | Kalkunte et al. | |
| 6,748,420 B1 | 6/2004 | Quatrano et al. | |
| 6,754,215 B1 | 6/2004 | Arikawa et al. | |
| 6,757,706 B1 | 6/2004 | Dong et al. | |
| 6,775,673 B2 | 8/2004 | Mahalingam et al. | |
| 6,775,679 B2 | 8/2004 | Gupta | |
| 6,782,450 B2 | 8/2004 | Arnott et al. | |
| 6,801,960 B1 | 10/2004 | Ericson et al. | |
| 6,826,613 B1 | 11/2004 | Wang et al. | |
| 6,839,761 B2 | 1/2005 | Kadyk et al. | |
| 6,847,959 B1 * | 1/2005 | Arrouye et al. | 707/2 |
| 6,847,970 B2 | 1/2005 | Keller et al. | |
| 6,850,997 B1 | 2/2005 | Rooney et al. | |
| 6,880,017 B1 | 4/2005 | Marce et al. | |
| 6,889,249 B2 | 5/2005 | Miloushev et al. | |
| 6,914,881 B1 | 7/2005 | Mansfield et al. | |
| 6,922,688 B1 | 7/2005 | Frey, Jr. | |
| 6,934,706 B1 | 8/2005 | Mancuso et al. | |
| 6,938,039 B1 | 8/2005 | Bober et al. | |
| 6,938,059 B2 | 8/2005 | Tamer et al. | |
| 6,959,373 B2 | 10/2005 | Testardi | |
| 6,961,815 B2 | 11/2005 | Kistler et al. | |
| 6,973,455 B1 | 12/2005 | Vahalia et al. | |
| 6,973,549 B1 | 12/2005 | Testardi | |
| 6,975,592 B1 | 12/2005 | Seddigh et al. | |
| 6,985,936 B2 | 1/2006 | Agarwalla et al. | |
| 6,985,956 B2 | 1/2006 | Luke et al. | |
| 6,986,015 B2 | 1/2006 | Testardi | |
| 6,990,114 B1 | 1/2006 | Erimli et al. | |
| 6,990,547 B2 | 1/2006 | Ulrich et al. | |
| 6,990,667 B2 | 1/2006 | Ulrich et al. | |
| 6,996,841 B2 | 2/2006 | Kadyk et al. | |
| 7,010,553 B2 | 3/2006 | Chen et al. | |
| 7,013,379 B1 | 3/2006 | Testardi | |
| 7,039,061 B2 | 5/2006 | Connor et al. | |
| 7,051,112 B2 | 5/2006 | Dawson | |
| 7,072,917 B2 | 7/2006 | Wong et al. | |
| 7,075,924 B2 | 7/2006 | Richter et al. | |
| 7,089,286 B1 | 8/2006 | Malik | |
| 7,111,115 B2 | 9/2006 | Peters et al. | |
| 7,113,962 B1 | 9/2006 | Kee et al. | |
| 7,120,746 B2 | 10/2006 | Campbell et al. | |
| 7,127,556 B2 | 10/2006 | Blumenau et al. | |
| 7,133,967 B2 | 11/2006 | Fujie et al. | |
| 7,146,524 B2 | 12/2006 | Patel et al. | |
| 7,152,184 B2 | 12/2006 | Maeda et al. | |
| 7,155,466 B2 | 12/2006 | Rodriguez et al. | |
| 7,165,095 B2 | 1/2007 | Sim | |
| 7,167,821 B2 | 1/2007 | Hardwick et al. | |
| 7,173,929 B1 | 2/2007 | Testardi | |
| 7,194,579 B2 | 3/2007 | Robinson et al. | |
| 7,234,074 B2 | 6/2007 | Cohn et al. | |
| 7,236,491 B2 | 6/2007 | Tsao et al. | |
| 7,280,536 B2 | 10/2007 | Testardi | |
| 7,284,150 B2 | 10/2007 | Ma et al. | |
| 7,293,097 B2 | 11/2007 | Borr | |
| 7,293,099 B1 | 11/2007 | Kalajan | |
| 7,293,133 B1 | 11/2007 | Colgrove et al. | |
| 7,343,398 B1 | 3/2008 | Lownsbrough | |
| 7,346,664 B2 | 3/2008 | Wong et al. | |
| 7,383,288 B2 | 6/2008 | Miloushev et al. | |
| 7,401,220 B2 | 7/2008 | Bolosky et al. | |
| 7,406,484 B1 | 7/2008 | Srinivasan et al. | |
| 7,415,488 B1 | 8/2008 | Muth et al. | |
| 7,415,608 B2 | 8/2008 | Bolosky et al. | |
| 7,440,982 B2 | 10/2008 | Lu et al. | |
| 7,475,241 B2 | 1/2009 | Patel et al. | |
| 7,477,796 B2 | 1/2009 | Sasaki et al. | |
| 7,509,322 B2 | 3/2009 | Miloushev et al. | |
| 7,512,673 B2 | 3/2009 | Miloushev et al. | |
| 7,519,813 B1 | 4/2009 | Cox et al. | |
| 7,562,110 B2 | 7/2009 | Miloushev et al. | |
| 7,571,168 B2 | 8/2009 | Bahar et al. | |
| 7,574,433 B2 | 8/2009 | Engel | |
| 7,599,941 B2 | 10/2009 | Bahar et al. | |
| 7,610,307 B2 | 10/2009 | Havewala et al. | |
| 7,624,109 B2 | 11/2009 | Testardi | |
| 7,639,883 B2 | 12/2009 | Gill | |
| 7,653,699 B1 | 1/2010 | Colgrove et al. | |
| 7,685,177 B1 | 3/2010 | Hagerstrom et al. | |
| 7,734,603 B1 | 6/2010 | McManis | |
| 7,788,335 B2 | 8/2010 | Miloushev et al. | |
| 7,809,691 B1 | 10/2010 | Karmarkar et al. | |
| 7,822,939 B1 | 10/2010 | Veprinsky et al. | |

| Patent/Pub. No. | Date | Inventor(s) |
|---|---|---|
| 7,831,639 B1 | 11/2010 | Panchbudhe et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,913,053 B1 | 3/2011 | Newland |
| 7,958,347 B1 | 6/2011 | Ferguson |
| 8,005,953 B2 | 8/2011 | Miloushev et al. |
| 2001/0007560 A1 | 7/2001 | Masuda et al. |
| 2001/0014891 A1* | 8/2001 | Hoffert et al. ............. 707/104.1 |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1* | 5/2002 | Bradley ........................... 707/2 |
| 2002/0073105 A1* | 6/2002 | Noguchi et al. ............. 707/200 |
| 2002/0083118 A1 | 6/2002 | Sim |
| 2002/0087887 A1 | 7/2002 | Busam et al. |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0138502 A1 | 9/2002 | Gupta |
| 2002/0143909 A1 | 10/2002 | Botz et al. |
| 2002/0147630 A1 | 10/2002 | Rose et al. |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0188667 A1* | 12/2002 | Kirnos .......................... 709/203 |
| 2002/0194342 A1 | 12/2002 | Lu et al. |
| 2003/0009429 A1 | 1/2003 | Jameson |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1 | 3/2003 | McCann et al. |
| 2003/0065956 A1 | 4/2003 | Belapurkar et al. |
| 2003/0115218 A1 | 6/2003 | Bobbitt et al. |
| 2003/0115439 A1 | 6/2003 | Mahalingam et al. |
| 2003/0128708 A1 | 7/2003 | Inoue et al. |
| 2003/0135514 A1 | 7/2003 | Patel et al. |
| 2003/0149781 A1 | 8/2003 | Yared et al. |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0017825 A1 | 1/2004 | Stanwood et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0044705 A1* | 3/2004 | Stager et al. .................. 707/204 |
| 2004/0054777 A1 | 3/2004 | Ackaouy et al. |
| 2004/0093474 A1 | 5/2004 | Lin et al. |
| 2004/0098383 A1 | 5/2004 | Tabellion et al. |
| 2004/0098595 A1 | 5/2004 | Aupperle et al. |
| 2004/0133573 A1 | 7/2004 | Miloushev et al. |
| 2004/0133577 A1 | 7/2004 | Miloushev et al. |
| 2004/0133606 A1 | 7/2004 | Miloushev et al. |
| 2004/0133607 A1 | 7/2004 | Miloushev et al. |
| 2004/0133652 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0199547 A1 | 10/2004 | Winter et al. |
| 2004/0213156 A1 | 10/2004 | Smallwood et al. |
| 2004/0236798 A1 | 11/2004 | Srinivasan et al. |
| 2004/0267830 A1 | 12/2004 | Wong et al. |
| 2005/0021615 A1 | 1/2005 | Arnott et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0175013 A1 | 8/2005 | Le Pennec et al. |
| 2005/0187866 A1 | 8/2005 | Lee |
| 2005/0198501 A1 | 9/2005 | Andreev et al. |
| 2005/0213587 A1 | 9/2005 | Cho et al. |
| 2005/0246393 A1 | 11/2005 | Coates et al. |
| 2005/0289109 A1* | 12/2005 | Arrouye et al. ...................... 707/1 |
| 2005/0289111 A1* | 12/2005 | Tribble et al. ...................... 707/1 |
| 2006/0010502 A1 | 1/2006 | Mimatsu et al. |
| 2006/0045096 A1 | 3/2006 | Farmer et al. |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0123062 A1 | 6/2006 | Bobbitt et al. |
| 2006/0140193 A1 | 6/2006 | Kakani et al. |
| 2006/0153201 A1 | 7/2006 | Hepper et al. |
| 2006/0161518 A1 | 7/2006 | Lacapra |
| 2006/0167838 A1 | 7/2006 | Lacapra |
| 2006/0179261 A1 | 8/2006 | Rajan |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0212746 A1 | 9/2006 | Amegadzie et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1 | 11/2006 | Schaefer et al. |
| 2006/0268692 A1 | 11/2006 | Wright et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1 | 12/2006 | Mark et al. |
| 2007/0022121 A1 | 1/2007 | Bahar et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0088702 A1 | 4/2007 | Fridella et al. |
| 2007/0098284 A1 | 5/2007 | Sasaki et al. |
| 2007/0136308 A1 | 6/2007 | Tsirigotis et al. |
| 2007/0208748 A1 | 9/2007 | Li |
| 2007/0209075 A1 | 9/2007 | Coffman |
| 2007/0226331 A1 | 9/2007 | Srinivasan et al. |
| 2008/0046432 A1 | 2/2008 | Anderson et al. |
| 2008/0070575 A1 | 3/2008 | Claussen et al. |
| 2008/0104443 A1 | 5/2008 | Akutsu et al. |
| 2008/0208933 A1 | 8/2008 | Lyon |
| 2008/0209073 A1 | 8/2008 | Tang |
| 2008/0222223 A1 | 9/2008 | Srinivasan et al. |
| 2008/0243769 A1 | 10/2008 | Arbour et al. |
| 2008/0282047 A1 | 11/2008 | Arakawa et al. |
| 2009/0007162 A1 | 1/2009 | Sheehan |
| 2009/0037975 A1 | 2/2009 | Ishikawa et al. |
| 2009/0041230 A1 | 2/2009 | Williams |
| 2009/0055607 A1 | 2/2009 | Schack et al. |
| 2009/0077097 A1 | 3/2009 | Lacapra et al. |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0254592 A1 | 10/2009 | Marinov et al. |
| 2010/0211547 A1 | 8/2010 | Kamei et al. |
| 2011/0087696 A1 | 4/2011 | Lacapra |
| 2011/0093471 A1 | 4/2011 | Brockway et al. |

FOREIGN PATENT DOCUMENTS

| | | |
|---|---|---|
| CA | 2512312 A1 | 7/2004 |
| EP | 0605088 A3 | 2/1996 |
| EP | 0 738 970 A | 10/1996 |
| JP | 63010250 A | 1/1988 |
| JP | 6205006 A | 7/1994 |
| JP | 6-332782 A | 12/1994 |

| | | |
|---|---|---|
| JP | 821924 B | 3/1996 |
| JP | 08-328760 | 12/1996 |
| JP | 08-339355 | 12/1996 |
| JP | 9016510 A | 1/1997 |
| JP | 11282741 A1 | 10/1999 |
| JP | 2000-183935 | 6/2000 |
| NZ | 566291 A | 12/2008 |
| WO | 0239696 A2 | 5/2002 |
| WO | WO 02/056181 A3 | 7/2002 |
| WO | WO 2004/061605 A2 | 7/2004 |
| WO | WO 2008/130983 A1 | 10/2008 |
| WO | WO 2008/147973 A2 | 12/2008 |

OTHER PUBLICATIONS

Apple, Inc. "Mac OS X Tiger Keynote Intro. part 2" Jun. 2004, www.youtube.com <http://www.youtube.com/watch?v=zSBJwEmRJbY>, p. 1-2.*

"Auspex Storage Architecture Guide," Second Edition, 2001, Auspex Systems, Inc., www.ausoex.com, last accessed on Dec. 30, 2002.

"CSA Persistent File System Technology, Colorado Software" Architecture, Inc. White Paper, Jan. 1999, p. 1-3.

"Distributed File System: A Logical View of Physical Storage : White Paper," 1999, Microsoft Corp., www.microsoft.com, last accessed on Dec. 20, 2002.

"How DFS Works: Remote File Systems," Distributed File System (DFS) Technical Reference, retrieved from the Internet on Feb. 13, 2009: URL:http://technetmicrosoft.com/en-us/library/cc782417. aspx>(2003).

"NERSC Tutorials: I/O on the Cray T3E," chapter 8, "Disk Striping," National Energy Research Scientific Computing Center (NERSC), http://hpcf.nersc.gov, last accessed on Dec. 27, 2002.

"Scaling Next Generation Web Infrastructure with Content-Intelligent Switching : White Paper," Apr. 2000, Alteon WebSystems, Inc., (now Nortel Networks).

"The AFS File System in Distributed Computing Environment," May 1996, Transarc Corp., www.transarc.ibm.com, last accessed on Dec. 20, 2002.

"Veritas SANPoint Foundation Suite(tm) and SANPoint Foundation(trn) Suite HA: New Veritas Volume Management and File System Technology for Cluster Environments," Sep. 2001, Veritas Software Corp.

"Windows Clustering Technologies—An Overview," Nov. 2000, Microsoft Corp., www.microsoft.com, last accessed on Dec. 30, 2002.

Aguilera et al., "Improving recoverability in multi-tier storage systems," International Conference on Dependable Systems and Networks (DSN-2007), Edinburgh, Scotland, Jun. 2007, 10 pages.

Anderson et al., "Serverless Network File System," in the 15th Symposium on Operating Systems Principles, Dec. 1995, Association for Computing Machinery, Inc.

Anderson, Darrell C. et al., "Interposed Request Routing for Scalable Network Storage," ACM Transactions on Computer Systems 20(1):1-24 (Feb. 2002).

Cabrera et al., "Swift: A Storage Architecture for Large Objects," Proceedings of the Eleventh IEEE Symposium on Mass Storage Systems, pp. 123-428, Oct. 1991.

Cabrera et al., "Swift: Using Distributed Disk Striping to Provide High I/O Data Rates," Computing Systems 4, 4 (Fall 1991), pp. 405-436.

Cabrera et al, "Using Data Striping in a Local Area Network," 1992, technical report No. UCSC-CRL-92-09 of the Computer & Information Sciences Department of University of California at Santa Cruz.

Callaghan et al., "NFS Version 3 Protocol Spcification," (RFC 1813), 1995, The Internet Engineering Task Force (IETF), www.ietf.org, last accessed on Dec. 30, 2002.

Carns et al., "PVFS: A Parallel File System for Linux Clusters," Proceedings of the 4th Annual Linux Showcase and Conference, pp. 317-327, Atlanta, Georgia, Oct. 2000, USENIX Association.

Cavale, M. R., "Introducing Microsoft Cluster Service (MSCS) in the Windows Server 2003," Microsoft Corporation, Nov. 2002.

English Translation of Notification of Reason(s) for Refusal for JP 2002-556371 (Dispatch Date: Jan. 22, 2007).

Fan, et al., Summary Cache: A Scalable Wide—Area Web Cache Sharing Protocol, Computer Communications Review, Association for Computing Machinery, New York, USA 28(4):254-265 (1998).

Book Review by Farley, "Building Storage Networks," Jan. 2000, McGraw-Hill, ISBN 0072120509.

Gibson et al., "File Server Scaling with Network-Attached Secure Disks," in Proceedings of the ACM International Conference on Measurement and Modeling of Computer Systems (Sigmetrics '97), 1997, Association for Computing Machinery, Inc.

Gibson et al., "NASD Scalable Storage Systems," Jun. 1999, USENIX99, Extreme Linux Workshop, Monterey, California.

Hartman, "The Zebra Striped Network File System," 1994, Ph.D. dissertation submitted in the Graduate Division of the University of California at Berkeley.

Haskin et al., "The Tiger Shark File System," 1995, in proceedings of IEEE, Spring COMPCON, Santa Clara, CA, www.research.ibm. com, last accessed on Dec. 30, 2002.

Hwang et al., Designing SSI Clusters with Hierarchical Checkpointing and Single I/O Space, IEEE Concurrency, pp. 60-69, Jan.-Mar. 1999.

International Search Report for International Patent Application No. PCT/US03/41202 (Sep. 15, 2005).

International Search Report for International Patent Application No. PCT/US02/00720 (Jul. 8, 2004).

International Search Report for International Patent Application No. PCT/US2008/064677 (Sep. 6, 2009).

International Search Report for International Patent Application No. PCT/US2008/060449 (Apr. 9, 2008).

International Search Report for International Patent Application No. PCT/US2008/083117 (Jun. 23, 2009).

Karamanolis et al., "An Architecture for Scalable and Manageable File Services," HPL-2001-173 p. 1-14 (Jul. 26, 2001).

Katsurashima et al., "NAS Switch: A Novel CIFS Server Virtualization," Proceedings. 20th IEEE/11th NASA Goddard Conference on Mass Storage Systems and Technologies, 2003 (MSST 2003), Apr. 2003.

Kimball, C.E. et al., Automated Client-Side Integration of Distributed Application Servers, 13th LISA Conf., 1999. (no month, day).

Kohl et al., "The Kerberos Network Authentication Service (V5)," RFC 1510, Sep. 1993. (http://www.ietf.org/rfc/rfc1510. txt?number=1510.

Long et al., "Swift/RAID: A distributed RAID system," Computing Systems, vol. 7, pp. 333-359, Summer 1994.

Noghani et al.,"A Novel Approach to reduce Latency on the Internet: 'Component-Based Download'," Proceedings of the Int'l Conf. on Internet Computing, Las Vegas, NV pp. 1-6 (2000).

Norton et al., "CIFS Protocol Version CIFS-Spec 0.9," 2001, Storage Networking Industry Association (SNIA), www.snia.org, last accessed on Mar. 26, 2001.

Patterson et al., "A case for redundant arrays of inexpensive disks (RAID)," Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings," Comm. of the ACM, vol. 33, No. 6, Jun. 1990.

Peterson, "Introducing Storage Area Networks," Feb. 1998, InfoStor, www.infostor.com, last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14, 2000, www.usenix.org, last accessed on Dec. 20, 2002.

Rodriguez et al., "Parallel-access for Mirror Sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph—p. 868, col. 1, paragraph 1.

Savage, et al., "AFRAID—A Frequently Redundant Array of Inexpensive Disks," 1996 USENIX Technical Conf., San Diego, California, Jan. 22-26, 1996.

Soltis et al., The Design and Performance of Shared Disk File System for IRIX, 6th NASA Goddard Space Flight Center Conf. on Mass Storage & Technologies, IEEE Symposium on Mass Storage Systems, p. 1-17 (Mar. 1998).

Sorenson, K.M., "Installation and Administration: Kimberlite Cluster Version 1.1.0, Rev. D." Mission Critical Linux, (no year, month, day) http://oss.missioncriticallinux.com/kimberlite/kimberlite.pdf.

Stakutis, "Benefits of SAN-based file system sharing," Jul. 2000, InfoStor, www.infostor.com, last accessed on Dec. 30, 2002.

Thekkath et al., "Frangipani: A Scalable Distributed File System," in Proceedings of the 16th ACM Symposium on Operating Systems Principles, Oct. 1997, Association for Computing Machinery, Inc.

Wilkes, J., et al., "The HP AutoRAID Hierarchical Storage System," ACM Transactions on Computer Systems, vol. 14, No. 1, Feb. 1996.

Zayas, "AFS-3 Programmer's Reference: Architectural Overview," Transarc Corp., version 1.0 of Sep. 2, 1991, doc. number FS-00-D160.

"Welcome to the RSYNC Web Pages," Retrieved from the Internet URL: http://samba.anu.edu.au/rsync/ (Retrieved on Dec. 18, 2009).

Apple, Inc., "Mac OS X Tiger Keynote Intro. Part 2," Jun. 2004, www.youtube.com <http://www.youtube.com/watch?v=zSBJwEmR.JbY>, p. 1.

Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.

Basney, Jim et al., "Credential Wallets: A Classification of Credential Repositories Highlighting MyProxy," TPRC 2003, Sep. 19-21, 2003.

Botzum, Keys, "Single Sign On—A Contrarian View," Open Group Website, <http://www.opengroup.org/security/topics.htm>, Aug. 6, 2001, pp. 1-8.

English Language Abstract of JP 08-328760 from Patent Abstracts of Japan.

English Language Abstract of JP 08-339355 from Patent Abstracts of Japan.

English Translation of paragraphs 17, 32, and 40-52 of JP 08-328760.

Harrison, C., May 19, 2008 response to Communication pursuant to Article 96(2) EPC dated Nov. 9, 2007 in corresponding European patent application No. 02718824.2.

Hu, J., Final Office action dated Sep. 21, 2007 for related U.S. Appl. No. 10/336,784.

Hu, J., Office action dated Feb. 6, 2007 for related U.S. Appl. No. 10/336,784.

Klayman, J., Nov. 13, 2008 e-mail to Japanese associate including instructions for response to office action dated May 26, 2008 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Korkuzas, V., Communication pursuant to Article 96(2) EPC dated Sep. 11, 2007 in corresponding European patent application No. 02718824.2-2201.

Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.

Novotny, Jason et al., "An Online Credential Repository for the Grid: MyProxy," 2001, pp. 1-8.

Pashalidis, Andreas et al., "A Taxonomy of Single Sign-On Systems," 2003, pp. 1-16, Royal Holloway, University of London, Egham Surray, TW20, 0EX, United Kingdom.

Pashalidis, Andreas et al., "Impostor: a Single Sign-On System for Use from Untrusted Devices," Global Telecommunications Conference, 2004, GLOBECOM '04, IEEE, Issue Date: Nov. 29-Dec. 3 , 2004.Royal Holloway, University of London.

Response filed Jul. 6, 2007 to Office action dated Feb. 6, 2007 for related U.S. Appl. No. 10/336,784.

Response filed Mar. 20, 2008 to Final Office action dated Sep. 21, 2007 for related U.S. Appl. No. 10/336,784.

Soltis et al., "The Global File System," in Proceedings of the Fifth NASA Goddard Space Flight Center Conference on Mass Storage Systems and Technologies, Sep. 17-19, 1996, College Park, Maryland.

Tulloch, Mitch, "Microsoft Encyclopedia of Security," pp. 218, 300-301, Microsoft Press, 2003, Redmond, Washington.

Uesugi, H., English translation of office action dated May 26, 2008 in corresponding Japanese patent application No. 2002-556371.

Gupta et al., "Algorithms for Packet Classification", Computer Systems Laboratory, Stanford University, CA, Mar./Apr. 2001, pp. 1-29.

Heinz II G., "Priorities in Stream Transmission Control Protocol (SCTP) Multistreaming", Thesis submitted to the Faculty of the University of Delaware, Spring 2003, pp. 1-35.

Internet Protocol,"Darpa Internet Program Protocol Specification", (RFC:791), Information Sciences Institute, University of Southern California, Sep. 1981, pp. 1-49.

Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.

Modiano E., "Scheduling Algorithms for Message Transmission Over a Satellite Broadcast System," MIT Lincoln Laboratory Advanced Network Group, Nov. 1997, pp. 1-7.

Ott D., et al., "A Mechanism for TCP-Friendly Transport-level Protocol Coordination", USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

Rosen E., et al., "MPLS Label Stack Encoding", (RFC:3032) Network Working Group, Jan. 2001, pp. 1-22, (http://www.ietf.org/rfc/rfc3032.txt).

Wang B., "Priority and Realtime Data Transfer Over the Best-Effort Internet", Dissertation Abstract, Sep. 2005, ScholarWorks@UMASS.

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

```
View Options                          Files System 106
==============                        ============

METADATA TAGS
=============

OBJECTTYPE: file, dir                                    x

FILENAME: name                                        x
PATH: path                                            x  x
OWNER: name                                           x  x
AGE: <1day,<1week,<1month,<1year,>1yr                 x  x
SIZE: <1MB, 1MB~10MB, >10MB                           x  x
TYPE: word-doc,pdf-doc,presentation,
      spreadsheet,text,other                          x

SPECIFIC CONTENT TAGS
=====================

CONTENT:Company Confidential                          x
CONTENT:Patent                                        x
CONTENT:Competitor                                    x

DATA
====

All data from original file
First 512 bytes from original file
```

*FIG. 2*

```
OBJECTTYPE:file
FILENAME:patent_application_001.doc
PATH:\corp\engineering\patents
OWNER:John_Smith
AGE:<1year
SIZE:<1MB
TYPE:word-doc
CONTENT:Company Confidential
CONTENT:Patent
```

```
CREATE3res NFSPROC3_CREATE(CREATE3args) = 8;
enum createmode3 {
      UNCHECKED = 0,
      GUARDED = 1,
      EXCLUSIVE = 2
};

union createhow3 switch (createmode3 mode) {
case UNCHECKED:
case GUARDED:
      sattr3 obj_attributes;
case EXCLUSIVE:
      createverf3 verf: };

struct CREATE3args {
    diropargs3 where;
    createhow3 how;
};

struct CREATE3resok {
    post_op_fh3 obj;
    post_op_attr obj_attributes;
    wcc_data dir_wcc;
};

struct CREATE3resfail {
    wcc_data dir_wcc; };

union CREATE3res switch (nfsstat3 status) {
case NFS3_OK:
    CREATE3resok resok;
default:
    CREATE3resfail resfail;
};
```

NFS CREATE REMOTE PROCEDURE CALL FORMAT

*FIG. 8*

```
View Options                    File System 205
================================================
STATISTICS TAGS
===============
READ-BITES:bytes                                    x
WRITE-BITES:bytes                                   x READ-RATE:high,med,low                              x
WRITE-RATE:high,med,low                             x READERS:count                                       x
WRITERS:count                                       x READ-BY-NAME:name                                   x
READ-BY-IP:ipadr                                    x WRITE-BY-NAME:name                                  x
WRITE-BY-IP:ipadr                                   x READ-OPS:count
WRITE-OPS:count
OTHER-OPS:count READ-OPRATE:high,med,low
WRITE-OPRATE:high,med,low
OTHER-OPRATE:high,med,low
```

REPRESENTATIVE EXAMPLES OF STATISTICS TAGS IN A VIEW CONFIGURATION

*FIG. 11*

```
View Options                    File System 205
================================================
OPERATION TAGS
==============
CREATE-TIME:time                                    x
CREATE-BY:name                                      x
CREATE-BY-IP:ipadr                                  x DELETE-TIME:time                                    x
DELETE-BY:name                                      x
DELETE-BY-IP:ipadr                                  x RENAME-TIME:time                                    x
RENAME-BY-NAME:name                                 x
RENAME-BY-IP:ipadr                                  x READ-TIME:time                                      x
READ-CMD:offset byte-range name ipadr time          x
READ-BY-NAME:ipadr                                  x
READ-BY-IP:ipadr                                    x WRITE-CMD:offset byte-range name ipadr time         x
WRITE-TIME:time                                     x
WRITE-BY:name                                       x
WRITE-BY-IP:ipadr                                   x
```

REPRESENTATIVE EXAMPLES OF OPERATION TAGS IN A VIEW CONFIGURATION

*FIG. 12*

```
FILENAME:patent_application_001tmp.doc
CREATE-AT-TIME:032006-0300
CREATE-BY-IP:192.168.32.25
CREATE-BY-NAME:John_Smith
DELETE-AT-TIME:032006-0444
DELETE-BY-IP:192.168.32.56
DELETE-BY-NAME:Peter_Brown
DELETED:<1month
RESTORE_FROM:\\backup1\032006\corp\engineering\patents
```

```python
#!/usr/bin/env python2

# Copyright 2005 Google, Inc.
# All Rights Reserved.

# A helper script that pushes an xml file to the feeder.
# This example provides a simple feed function.

# This example is written in Python.
# Code blocks are determined by indentation.
# See www.python.org for more information.

import sys
import string
import urllib
import getopt def usage():
  print """Usage: %s ARGS
  --datasource: name of the datasource
  --feedtype: full or incremental
  --url: xmlfeed url of the feedergate, e.g. http://gsabox:19900/xmlfeed
  --xmlfilename: The feed xml file you want to feed
  --help: output this message""" % sys.argv[0]

def main(argv):
  try:
    opts, args = getopt.getopt(argv[1:], None,
                  ("help", "datasource=", "feedtype=", "url=",
                   "xmlfilename="))
  except getopt.GetoptError:
        # print help informaiton and exit:
        usage()
        sys.exit(2)

url = None
  datasource = None
  feedtype = None
  xmlfilename = None for opt, arg in opts:
      if opt == "--help":
              usage()
              sys.exit()
      if opt == "--datasource":
              datasource = arg
      if opt == "--feedtype":
              feedtype = arg
      if opt == "--url":
              url = arg
      if opt == "--xmlfilename":
              xmlfilename = arg params = []

if (url and xmlfilename and datasource and
          feedtype in ("full", "incremental")):
      params.append(("feedtype", feedtype))
      params.append(("datasource", datasource))
      content = open(xmlfilename, "r").read()
      params.append(("data", content))
      payload = urllib.urlencode(params)
      print "---"
      response = urllib.urlopen(url, payload)
      print response.read()
  else:
      usage()
      sys.exit(1)

if __name__ == '__main__':
    main(sys.argv)
```

*FIG. 15*

FILE SYSTEM MANAGEMENT WITH ENHANCED SEARCHABILITY

RELATED APPLICATIONS

This application is related to and claims the benefit of earlier filed U.S. Provisional Patent Application Ser. No. 60/788,851 entitled "Method and System to Generate, Maintain, and Use Application Optimized Information Views," filed on Apr. 3, 2006, the entire teachings of which are incorporated herein by this reference.

BACKGROUND

It is currently an enormous challenge for global enterprises to manage their vast stores of digital information. Storage capacity currently grows at annual rates of 30-70% in many enterprises, so the task of scaling storage capacity is a significant challenge.

Recently, certain technologies have been developed to reduce the complexity of scaling capacity. An example of such a technology is embodied in Acopia Network's Adaptive Resource Networking Switch.

Since scaling of storage capacity is starting to be addressed, increasing attention has been focused on raising the intelligence of storage management to achieve objectives beyond scaling. Often, the easiest way to add intelligence to a storage system is use of independent applications that layer above the storage infrastructure. For example, conventional search engines can be used to index content stored in network file systems and provide an Enterprise Search capability that is similar to the search capability provided on the Internet.

SUMMARY

Unfortunately, conventional approaches to the direct application of search engine technology to Enterprise information presents a new set of challenges. For example, the conventional act of indexing network file systems can tax already burdened servers and slow critical business applications. In addition, conventional context-based indexing often suffers from a so-called "needle in the haystack" problem in which it is difficult find appropriate data to generate a response to a query or search. Thus, conventional techniques do not provide an efficient way for Enterprise users to easily find many different types of information.

Techniques discussed herein deviate with respect to conventional applications such as those discussed above as well as techniques known in the prior art. In particular, embodiments herein support consolidation of information in a primary file system for inclusion in a secondary file system optimized for performing searches associated with files stored in a primary file system.

More specifically, in one embodiment, beyond supporting mere searching, the system disclosed herein is based in part on an observation that it would be useful for enterprises to have the ability to continually (in "real-time") align storage and management of information according to current business requirements for each specific piece of information (e.g., file). Unfortunately, the business requirements related to a particular set of digital information (e.g., file, document, content, etc.) can vary greatly over the lifetime of the information. Every piece of information can have different requirements. Therefore, a solution that addresses the challenge of managing information over its lifetime must be able to detect changes in the business requirements related to each piece of digital information and then perform any required changes to the storage and management approach at the granularity of the piece of digital information.

There is no conventional general-purpose solution to these challenges today.

In contrast to conventional methods, embodiments disclosed herein provide advancements over conventional techniques to significantly overcome the aforementioned issues. In one embodiment, information stored in a network file system is automatically converted to a form (a "view") optimized for use by a search application. Using this optimized view of a primary file system in a secondary file system, the user of the search application can perform many types of queries against the stored information, which are much simpler to describe, faster to execute, and provide more accurate results. Based on techniques as described herein, an index to a stored file in a master file system can be generated much more quickly with much less overhead on existing storage than is possible according to conventional methods.

Accordingly, in a general embodiment as described herein includes maintaining a primary (e.g., master) file system to store multiple files and corresponding metadata. A view generator function receives template information (e.g., view configuration information) specifying types of metadata information associated with the multiple files stored in the primary file system. Based on processing of the metadata information in the primary file system as specified by the template information, the generator function produces metadata for inclusion in a secondary file system used to satisfy search inquiries associated with the multiple files stored in the primary file system.

In one embodiment, the generator function replicates metadata information in the primary file system as specified by the template information for inclusion in the secondary file system. The secondary file system (e.g., a refined version of the master file system) is then used to carry out search inquiries in a more efficient manner than applying search inquiries to the master file system.

In addition to inclusion of metadata information from a file in the master file system as specified by view configuration information (e.g., template information), the metadata information in the secondary file system can include data from a corresponding file in the primary file system. In certain embodiments, the metadata information in the secondary file system (e.g., more easily searched file system) can include information indicating different operations that have been applied to a respective file in the master file system.

In yet other embodiments, the metadata information stored in the secondary file system can include data derived from one or more sources such as content management applications that store extended metadata information about files as well as applications that analyze files and produce extended metadata.

In addition to the embodiments as discussed above, other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs (executed by one or more servers) to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

In addition to the embodiments discussed above, other embodiments herein include a computerized device (e.g., a server, a host computer, workstation, etc.) configured to support the techniques disclosed herein such as creation and/or updating of routines to carry out operations with respect to a staging database and master database. In such embodiments, a computer environment to carry out the invention includes a memory system, a processor (e.g., a processing device), a respective display, and an interconnect connecting the processor and the memory system. The interconnect can also support communications with the respective display (e.g., display screen or display medium). The memory system can be encoded with an application that, when executed on a respective processor, supports content management and searching functions according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to manage content according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product or computer environment that includes a computer readable medium having instructions stored thereon to facilitate management of content such as files. The instructions and corresponding execution support operations of: i) maintaining a primary file system (e.g., in a primary repository) to store multiple files; ii) receiving template information specifying types of metadata information associated with the multiple files stored in the primary file system; and iii) processing the metadata information in the primary file system as specified by the template information for production of metadata in a secondary file system (e.g., in a secondary repository) used to satisfy search inquiries associated with the multiple files stored in the primary file system.

Other embodiments include a method supporting operations of: i) receiving template information specifying types of metadata information; ii) applying the template information to a given file in a primary file system to produce a set of metadata information; and iii) storing the set of metadata information in a secondary file system information used to satisfy search inquiries associated with files stored in the primary repository.

Other embodiments of the present disclosure include hardware and/or software programs to perform any of the method embodiment steps and operations summarized above and disclosed in detail below.

It should be understood that the system disclosed herein may be embodied strictly as a software program, as software and hardware, or as hardware alone. The features disclosed herein may be employed in data communications devices and other computerized devices and software systems for such devices such as those manufactured by Acopia Networks, Inc., of Lowell, Mass.

As mentioned above, techniques herein are well suited for use in applications such as those supporting management of stored information such as file systems and/or databases. However, it should be noted that configurations herein are not limited to such use and thus configurations herein and deviations thereof are well suited for use in other environments as well.

Each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

FIG. 2 is a diagram of view configuration information specifying types of data in a primary file system to a secondary file system according to embodiments herein.

FIG. 3 is a diagram of example view information (e.g., replicated and stored metadata) associated with a file according to embodiments herein.

FIG. 8 is a diagram illustrating an example format of an NFS create operation according to embodiments herein.

FIG. 11 is a diagram illustrating an example set of file access statistics derived from a file operation log according to embodiments herein.

FIG. 12 is a diagram illustrating an example set of additional file access statistics derived by a file operation log according to embodiments herein.

FIG. 13 is a diagram of an example of metadata information associated with a deleted file according to embodiments herein.

FIG. 15 is a diagram of example code for updating indexes according to embodiments herein.

DETAILED DESCRIPTION OF EXAMPLE EMBODIMENTS

In the context of an embodiment herein, a primary (e.g., master) file system stores multiple files and corresponding metadata. A generator function creates a corresponding repository (e.g., a secondary file system) used for search purposes. For example, the generator function receives template information (e.g., view configuration information) specifying types of metadata information associated with the multiple files stored in the primary file system. Based on processing of the metadata information in the primary file system as specified by the template information, the generator function produces metadata for inclusion in a secondary file system, which is used to satisfy search inquiries associated with the multiple files stored in the primary file system.

According to one arrangement, the generator function replicates metadata information in the primary file system as specified by the template information for inclusion in the secondary file system. The secondary file system (e.g., a refined version of the master file system) is then used to carry out search inquiries in a more efficient manner than applying search inquiries directly to the master file system.

Figure 1:
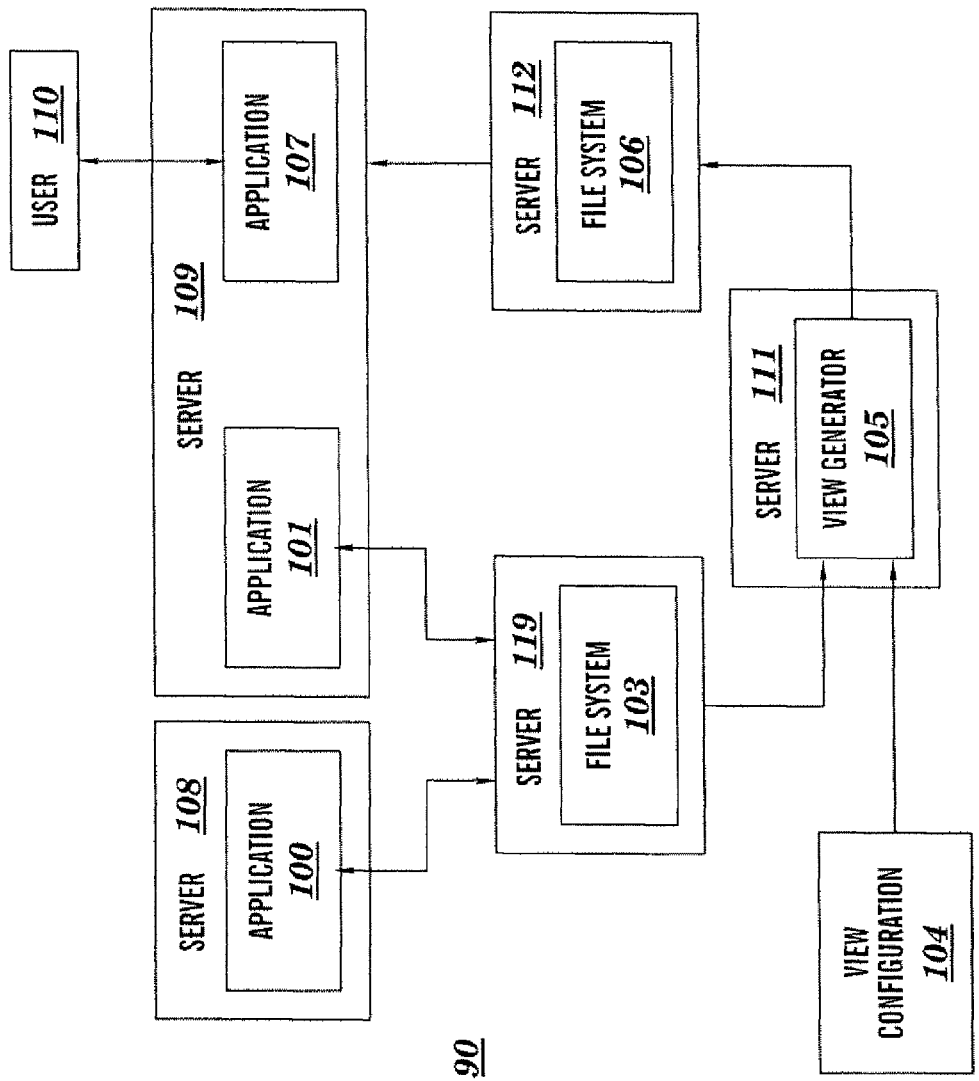
FIG. 1 is a diagram illustrating an example storage management system and corresponding components according to embodiments herein.
Figure 19:
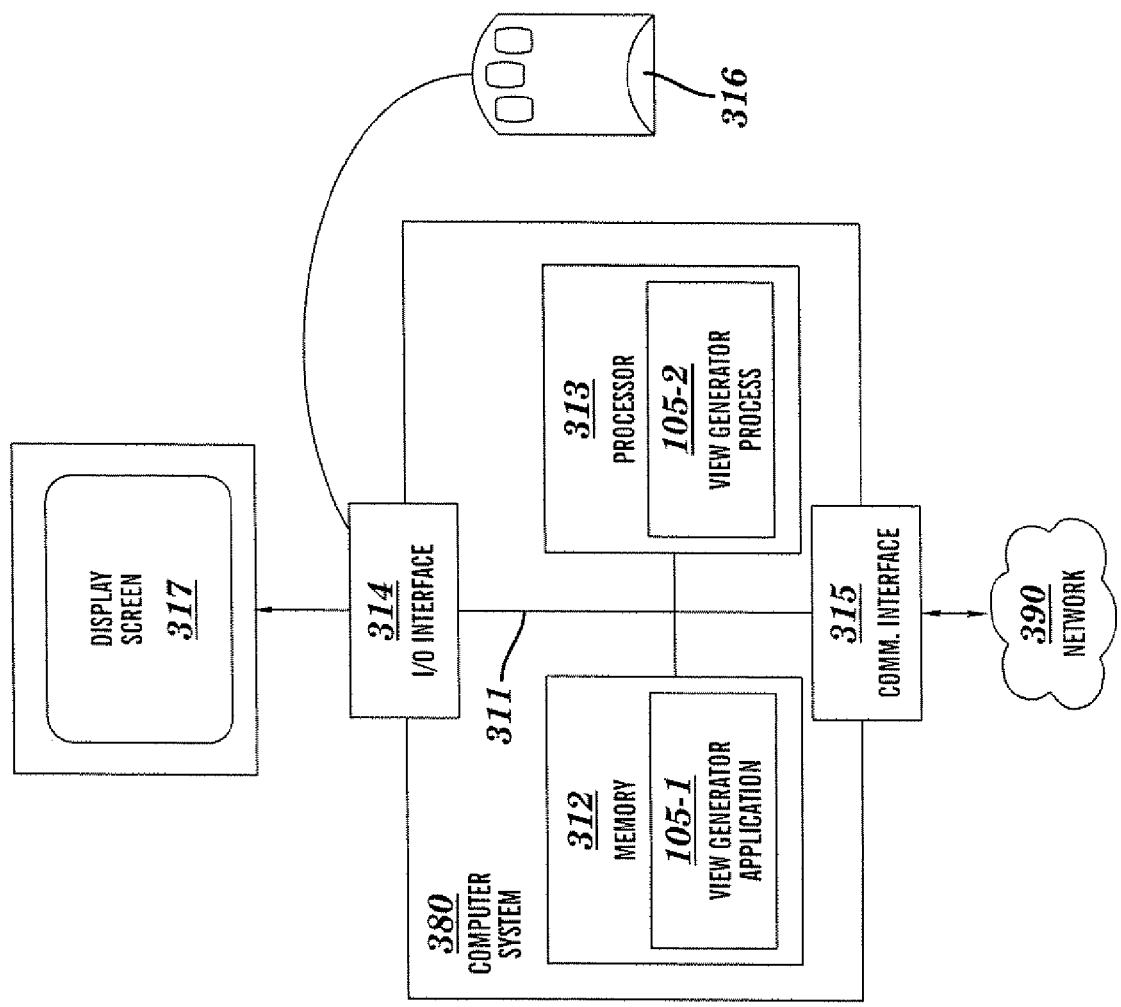
FIG. 19 is a diagram of an example architecture for carrying out different functionality such as a view generator function, logging function, etc. according to embodiments herein.

FIG. 1 is a diagram illustrating an example file management system 90 according to embodiments herein. As shown, file management system 90 includes server 108, server 109, server 119, server 111, and server 112. Server 108 supports execution of application 100. Server 109 supports execution of application 101 and application 107. Server 119 supports management of file system 103. Server 112 supports management of file system 106. Server 119 supports execution of view generator function 105, which produces file system 106 based on view configuration information 104 (e.g., template information) applied to contents of file system 103. Each of the servers (in FIG. 1 and other figures) can be a computer system (e.g., as shown in FIG. 19) configured to execute software and carry out the methods as described herein. Connections between servers can include one or more network connections (e.g., a local area network, wide area network, Internet, etc.)

In one embodiment, applications 100 and 101 are applications running on servers 108 and 109, respectively. Applications 100 and 101 have the ability to access (e.g., read and write to) file system 103 using a network file system protocol such as Network File System (NFS) or the Common Internet File System (CIFS) running over a network such as Ethernet.

In the context of the present example, file system 103 can be referred to as an "original" or "master" file system because it stores content (e.g., files) and corresponding metadata. File system 106 can be derived at least in part based on file system 103 and store information for carrying out searches with respect to the content in file system 103.

Server 119 includes a corresponding repository (e.g., storage media) to store and maintain file system 103. Similarly, server 112 includes a corresponding repository (e.g., storage media) to store and maintain file system 103.

In one embodiment, application 107 is a search application (such as, for example, the Google Desktop Search application from Google™, or any other type of search or querying application) running on server 109 that accesses file system 106 (e.g., via server 112) for purposes of identifying one or more files in file system 103 that satisfies a search query. As will be discussed later in this specification, the user 110 controls the application 107 to search for files in file system 103 by providing search criteria.

File system 106 can be considered an "optimized-view" file system because, according to one embodiment, it includes a scaled back or transformed version of the information contained in file system 103 (e.g., the master file system). File system 106 enables efficient searching of information stored in the file system 103.

Initially, assuming that file system 106 has not yet been created or that file system 103 and file system 106 need to be synchronized with each other, view generator 105 completely scans all of file system 103 and generates corresponding file system 106. Creation of file system 106 depends at least in part on view configuration information 104. That is, according to one embodiment, view configuration information 104 specifies the types of information in file system 103 to replicate and/or include in file system 106. Thus, file system 106 can include at least a partial replication of the master file system 103, but scaled down as specified by the view configuration information 104.

In one embodiment, view configuration 104 includes the information as illustrated in FIG. 2. As shown, view configuration information 104 indicates multiple view options or parameters such as object type, filename, path, owner, author, age, size, type, content tags, data, etc. These different options (e.g., metadata tag options and specific content tag options) indicate the different types of metadata in file system 103 associated with each of one or more files in file system 103 that can be replicated and reproduced in file system 106. Markings (e.g., x-marks) in the column labeled "File System 106" of view configuration information 104 indicate what types of metadata and/or file data will be copied from the master file system 103 to the file system 106 for a given one or more file or directories (e.g., resources) to which the view configuration information 104 is applied.

The two options (e.g., "All data from original file" and "First 512 bytes from original file") under "DATA" heading specify whether to copy an entire original file, or 512 bytes of the original file, etc. from file system 103 over to file system 106. Accordingly, view configuration information 104 can specify types of metadata as well as portions of content in file system 103 for copying over to file system 106. Thus, certain embodiments herein are directed towards applying view configuration information 104 (e.g., template information) to a respective file or directory in the file system 103 and replicating a portion of the respective file in the file system 103 for inclusion in the file system 106.

The view configuration information 104 can be applied to any resources such as a single file, a set of files, a directory resource, etc. Also, note that file management system 90 can include multiple different instances of view configuration information 104 that are applied to different files in file system 103 to produce file system 106. Accordingly, file system 106 can include a copy of a complete file and corresponding metadata for certain specified files, directory of files, etc. while file system 106 includes only certain specified types of metadata for other specified files, etc.

As mentioned, based on use of view configuration information 104 and file system 103, view generator function 105 generates file system 106. Note that the file system 106 can include a directory and filename structure that corresponds directly to the directory and filename structure of file system 103. For example, the file system 103 can include a hierarchical tree of directories, sub-directories, filenames, etc. for storing content such as multiple files. File system 106 can include a same or substantially similar hierarchical tree structure as file system 103 for storing replicated information.

When creating file system 106, the view generator function 105 can default to configuring the same security and access control settings in optimized file system 106 as the settings found in file system 103.

As mentioned above, view generator 105 creates the files and/or metadata information stored in file system 106 to include the text strings or tags which are marked with an "X" in the "File System 106" column of FIG. 2 for view configuration information 104 that will be applied to a particular file in the master file system 103.

For example, consider a file in file system 103 called "patent_application_001.doc", which is stored in a directory or file path such as \corp\engineering. Based on examining the file system attributes (e.g., metadata information associated with "patent_application_001.doc") in file system 103, view generator 105 determines "patent_application_001.doc" has a file size less than 1 MB, a last modify time that is greater than one month and less than 1 year ago, the file is owned by user John Smith, etc. When creating file system 106, the view generator 105 formats this information (of file system 103) into strings in accordance with the view configuration information 104 in FIG. 2 (assuming that the view configuration information 104 applies to "patent_application_001.doc").

These data strings as specified by the view configuration information 104 are then written to the file "patent_application_001.doc" in file system 106. Since the view configuration information 104 in this example also specifies text strings to be searched in the original file, view generator 110 reads the contents of file "patent_application_001.doc" in file system 103 and searches for the strings "Company Confidential", "Patent", and "Competitor" as specified by specific content tags in view configuration information 104. In this example, assume that the view generator function 105 finds the first two strings (e.g., "Company Confidential", "Patent"), but not the third string ("Competitor"). The view generator function 105 then writes this information in the format described in FIG. 2 to the file "patent_application_001.doc" in file system 106. An example of final data written to file system 106 for the example file "patent_application_001.doc" is shown in FIG. 3. Accordingly, the view generator function 105 according to embodiments herein can support operations of retrieving a given file from the master file system 103 and, based on a text string as specified in the template information (e.g., view configuration information 104), search for instances of the text string in the given file. In response to detecting an instance of the text string (e.g., the word "patent") in the file, the view generator function 105 maintains the secondary repository of information to include an indication that the file includes at least one instance of the text string.

In one example embodiment as mentioned, at least a portion of file system 103 and file system 106 have a similar hierarchical tree structure for storing information. For example, assume that file system 103 includes a directory named "Sales Presentations" including respective files named "Presentation 1", "Presentation 2", and "Presentation 3." When creating file system 106, view generator function 105 applies corresponding view configuration information 104 to the named resources (e.g., the directory named "Sales Presentations" as well as each of the respective files named "Presentation 1", "Presentation 2", and "Presentation 3") to produce a respective file in the file system 106 for each resource. A file in the file system 106 can have an identical name as the corresponding file in the master file system 103 to which it is related. However, as discussed, the files (e.g., "Presentation 1", "Presentation 2", and "Presentation 3") in file system 103 each include the original information. The files in the file system 106 include metadata associated with the corresponding file master file system 103. Thus, the file named "Presentation 1" in the master file system 103 can include original information while the file named "Presentation 1" in file system 106 can include the appropriate metadata information (e.g., similar to that shown in FIG. 3), the file named "Presentation 2" in the master file system 103 can include original information while the file named "Presentation 2" in file system 106 can include the appropriate metadata information (e.g., similar to that shown in FIG. 3), and so on.

One benefit of naming the metadata files in the file system 106 with the same names as original files in file system 103 is that results produced by search application 107 immediately have a corresponding file path to any files in file system 103 that satisfy a search based on which metadata information in file system 106 produces a match. For example, suppose that a search application (e.g., application 107) utilizes an index to identify that the "view" file as in FIG. 3 satisfies search criteria provided by a user. Results of a search can include a file name and path the "view" file as in FIG. 3. When a hierarchical tree in the file system 106 mirrors the hierarchical tree for storing information in file system 103, the file name and file path to the "view" file is the same file path and file name information that can be used in the master file system 103 to retrieve the associated original document.

As described herein, although resources such as directories, sub-directories, folders, etc. may not have a corresponding file in file system 106, the file system 106 can include a "view" file for storing metadata associated with the directory, sub-directory, etc., even though the directory or folder may not be a file. Accordingly, a directory or folder in file system 103 can have arbitrary data (e.g., metadata information and a corresponding name optimized for searching) associated with it in file system 106 just as has been previously described for files. Directories in a respective file system normally do not store arbitrary "contents" as do files. As will be discussed below, one embodiment herein includes associating a directory in file system 103 with both a directory and a view file in file system 106. The arbitrary data (e.g., metadata information) associated with a directory can then be stored as content in the file associated with the directory in file system 106.

More specifically, one embodiment herein includes maintaining a "view" file in file system 106 for a directory of file system 103. The view file in file system 106 can have a special name that provides an indication that the "view" file corresponds to a storage resource (e.g., a directory) in the file system 103 that is not a file for storing data as do "Presentation 1", "Presentation 2", and "Presentation 3". For example, the directory name of an example directory in file system 103 is "Sales Presentations". The corresponding view file information (e.g., file of metadata information) in file system 106 can be named "Sales Presentation—DIRVIEW—". The text "DIRVIEW" (e.g., directory view) in this metadata file stored in file system 106 provides an indication that the corresponding resource in file system 103 is a directory instead of a file.

In this way, search application 107 can index any information that the view generator 105 stores as the contents of file "Sales Presentation—DIRVIEW—" and user can limit queries to directories by specifying the term OBJECTTYPE:DIR in a respective query. For example, a view file (e.g., including relevant metadata) associated with the "Sales Presentations" directory in file system 103 can include metadata information (e.g., OBJECTTYPE:DIR) indicating that the view file in file system 106 pertains to a directory in file system 103. For view files in file system 106 corresponding to files in file system 103, the view file information can specify OBJECTTYPE:FILE to specify that the corresponding resource in file system 103 pertaining to the view file is a file as opposed to a directory.

If the OBJECTTYPE is not specified then a corresponding search can be performed against both files and directories. If the OBJECTTYPE is specified in a search, then the corresponding search can be performed against the type of object (or objects) as specified by the search criteria.

In such an embodiment, file system 106 can now store information related to directory deletion and rename just as with files. This is important since the negative impact on an enterprise of accidental and inappropriate deliberate deletion and renaming of directories can be very high. Therefore, rapid and accurate diagnosis may be critical. Embodiments herein support such a function.

As another example, based on processing of the view configuration information 104 (e.g., template information), the view generator function 105 can identify selection of path information as a parameter associated with a given file in the primary repository to copy to the secondary repository. In other words, view configuration information 104 in FIG. 2 can indicate that metadata stored in file system 106 should include a path associated with a respective file. Accordingly, when creating the file system 106, the view generator function 105 replicates identified path information associated with the given file from the file system 103 for inclusion in the file system 106.

View generator function 105 can repeat the process of applying view configuration information 104 (or different versions of view configuration information) to each of multiple files in file system 103 to create file system 106.

As mentioned above, the DATA heading of view configuration information 104 of FIG. 2 specifies that the original data (i.e., user or application data) from this file (i.e., "patent_application_001.doc") will not be written to (the optimized view in) file system 106. For example, there are no checkmarks (e.g., Xs) in view configuration information 104 for entries under the heading DATA to copy data from a network original file of file system 103 to file system 106. Accordingly, the example information (e.g., metadata 310) in FIG. 3 for inclusion in file system 106 does not include any content (e.g., text strings) in the original file (e.g., "patent_application_001.doc") other than strings "Company Confidential" and the word "patent." Thus, the view configuration information 104 can be used as a filter for specifying what data in the file system 103 shall be copied over and included in file system 106.

Accordingly, embodiments herein include maintaining a first repository (e.g., file system 103) to include a first hierarchical tree structure for storing the multiple files and keeping track of corresponding metadata; maintaining a second repository (e.g., file system 106) to include a second hierarchical tree structure substantially similar to the first hierarchical tree structure; and utilizing the template information (e.g., view configuration information 104) to identify what if any portions of the multiple files and the corresponding metadata in the first hierarchical tree structure (e.g., file system 103) to copy to the second hierarchical tree structure (e.g., file system 106). In this way, file system 106 can provide a "view" into file system 103. In accordance with the view represented by file system 106, in lieu of including the data contents in the master file system 103, the file system 106 includes metadata represented as a configurable set of strings or "tags" as specified by the view configuration information 104. The type, format, or quantity of information that can be stored in file system 106 to provide a view as described herein need not be limited because the file management system 90 as described herein can support a wide range of views depending on settings as specified by the view configuration information 104, which can be optimized over time for a particular application.

Referring again to FIG. 1, according to one embodiment, application 107 can be a search application (e.g., a search engine application) that generates indexing information to contents of the files stored in file system 106 and/or corresponding information such as files stored in file system 103. In one embodiment, indexing is performed periodically based on algorithms defined within the search application. In similar fashion, the view generator 105 will periodically rescan the contents of file system 103 and then modify file system 106 to reflect any changes it discovers. Accordingly, file system 106 can be automatically synchronized with file system 103 over time.

Figure 4:
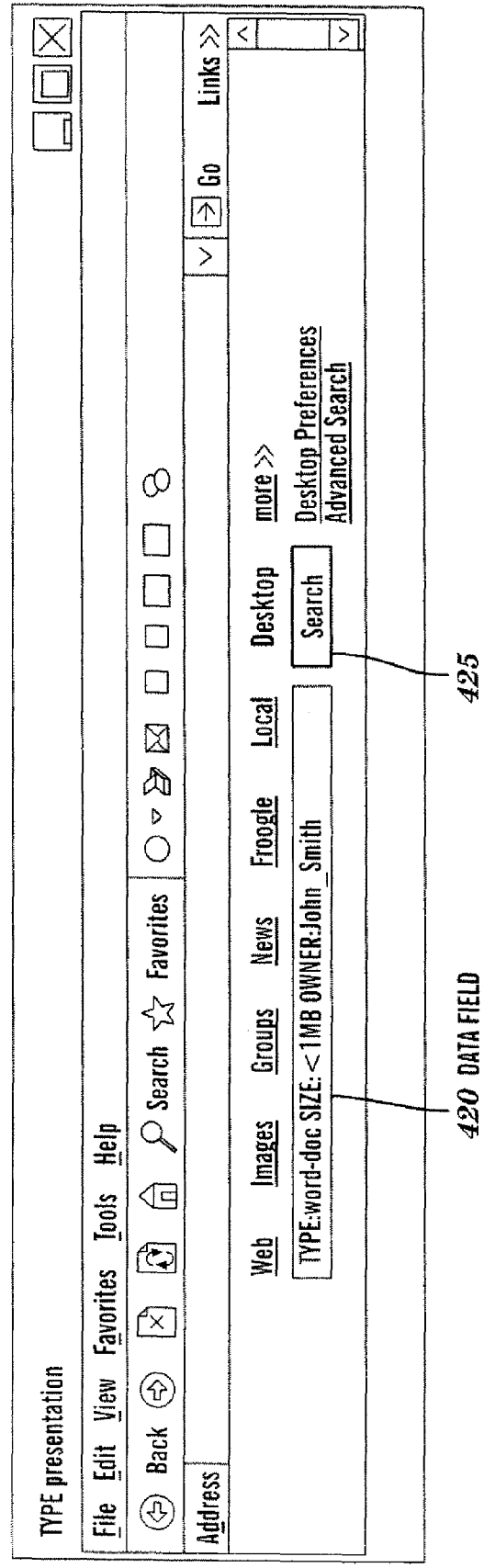
FIG. 4 is an example screenshot of a search engine and corresponding query applied to a secondary file system for identifying one or more files in a primary file system according to embodiments herein.

User 110 (e.g., a client at a corresponding computer system) can communicate over a link such as a network with server 109. Server 109 enables the user 110 to access application 107 and perform queries against the generated index (e.g., file system 106 that provides an index to content or files in file system 103). Typically, the user 110 can access application 107 via a web browser in communication with application 107. One example of a web browser screen to carry out searches is Google Desktop Search as shown in FIG. 4.

According to one embodiment, application 107 includes a number of functional components. For example, application 107 can be a search application including a "crawler" function that is configured to read all the contents of a specified file system or web server (e.g., file system 106) that needs to be searched, an "index" function that efficiently establishes the identity of any files that satisfy a query from a user (the crawler is the data source for the index), and a "search" function that provides a query interface (e.g., a web page) to the user enabling the user to input search criteria and thereafter that uses a generated index to identify matches and reply to query requests.

One purpose of the index function is to optimize the speed and performance of finding relevant documents for a search query. For example, the index function of application 107 produces an index (prior to receiving any search requests) that enables quick searching of information in a database in accordance with the "view" information (e.g., metadata information) stored in file system 106.

Without implementing an index function to pre-create an index (as in one embodiment herein), using a "brute force" search method, a search engine (e.g., application 107) would have to scan every file on every query which could take an impractical amount of time and consume unacceptable amounts of storage and computing resources. For example, an index according to embodiments herein of one million files can often provide accurate search results within a matter of milliseconds, whereas a raw scan and "brute force" search applied to a file system storing one million files could take on the order of hours. The cost of creating an index to provide faster search results is additional storage required to store the index. In certain instances, it may take a considerable amount of time to update an index when there are changes to a corresponding file system such as file system 106. Thus, these factors must be weighed when making a decision whether to implement an index function or not.

The most common search engines index "text" in human-readable documents. They typically support queries based on the presence (or absence) of various words or combinations of words. For example, a user of a search engine could search for all files that contain the word "tornado". Embodiments herein can greatly extend the applications of text-based search engines by "feeding" them alternative (and more optimized for their needs . . . ) forms of the original file system 103. These alternative forms can be easily defined, generated, and customized to meet varying needs without requiring any changes to existing file systems or search engine technologies.

By way of example, assume that a file system such as file system 106 contains a large number of documents used by an enterprise. A conventional approach would be to index every document in the file system. The alternative approach includes a technique of indexing an "optimized-view" (file system 106) of the original file system 103. The optimized view file system 106 can be defined to include the information most commonly used in searches. This can reduce the size of the index and increases its speed. For example, the index produced using the file system 106 can be much less complex and more useful than creating an index using master file system 103. For example, by representing a more structured view of an original file in file system 103 as a set of TAG: VALUE pairs (e.g., metadata information) stored in a secondary repository (e.g., file system 106) that is in turn indexed by an unmodified search engine, the customer (e.g., one or more users) gains the benefit of practical and fully-customized searches without changes to an existing infrastructure (e.g., file system 103). In other words, the search engine indexes the TAG:VALUE pairs in the file system 106 (e.g., secondary file system) as if the TAG:VALUE pairs were single words. Thus, a user can create a simple set of search criteria, which are easily executed by application 107 for producing useful results the user. In one embodiment, the application 107 can be accessed by a user 110 running on the same system (such is the case for Google Desktop Search which is considered a "personal" application). However, in alternative embodiments, application 107 can be executed on a computer system independent of a system on which the user is hosted as illustrated.

Figure 5:
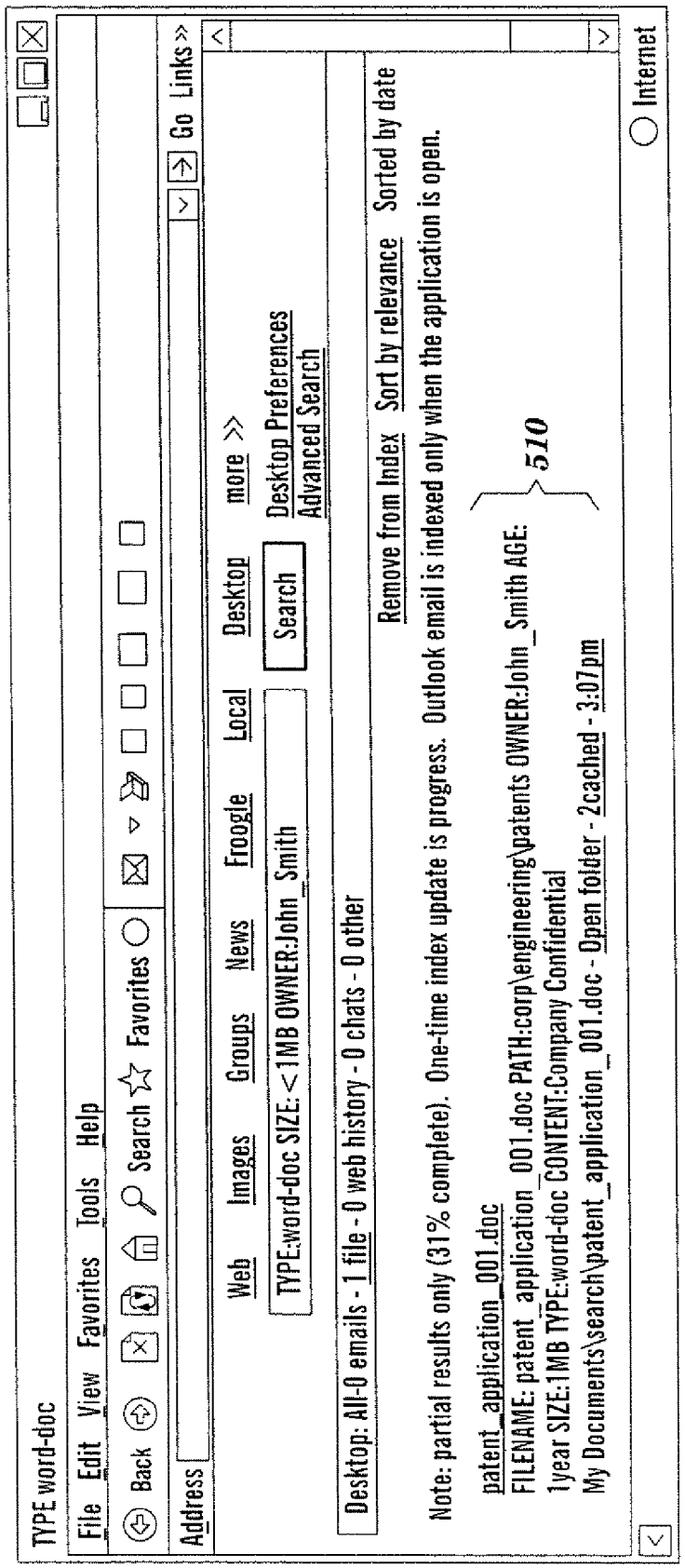
FIG. 5 is an example screenshot of a query response according to embodiments herein.

User 110 can construct a query (e.g., inquiry) using the search function 410 as shown in FIG. 4 using one or more text strings defined in FIG. 2. For example, based on input with respect to input data field 420, search function 110 in FIG. 4 illustrates a query generated by user 110 that instructs Google Desktop Search to return a list of all files in file system 106 which contain three strings: i) TYPE=word-doc, ii) SIZE<1 MB, and iii) OWNER=John Smith. The results returned by server 109 for this query are shown in FIG. 5.

As expected, the search results associated with the above search includes a link to "patent_application001.doc", which in this example is the only file in this optimized view (e.g., in file system 106) that contains the three text strings as specified by search criteria input to data field 420 by clicking on and/or activating search button 425. If other files in the file system 106 had corresponding metadata that satisfied the search criteria, such files also would be included in the results illustrated in FIG. 5. Thus, screenshot 500 in FIG. 5 specifies search results 510 that satisfy the inputted search criteria. Note that the search results 510 can include pointers (e.g., references or links such as URLs, links, file paths, etc.) to information stored in file system 103 and/or file system 106. A respective user 110 can therefore submit a respective search and thereafter easily obtain files or documents satisfying the search.

The index generated from the "view" represented by file system 106 can easily support some operations that are otherwise very difficult to perform using the index based on just use of file system 103. For example, using a standard query interface (e.g., the search function 410 in FIG. 4), there are no options to perform this query on the index of file system 103 and the user 110 (or users as the case may be) would be forced to use a different application or perform the search manually. Using an "advanced search" option of Google Desktop Search (e.g., search function 410 in FIG. 4), the user 110 may be able to perform a query to return all files of type presentation (by using a filter such as a Powerpoint filter), but the remaining query criteria (size and owner) would have to be applied manually by examining the size and owner for each returned file. Embodiments herein solve this problem because (as mentioned above) the search function can specify size, owner, and other parameters in the search for finding the appropriate stored information.

In an Enterprise environment, extra manual steps of browsing through a list of search results can be very time consuming and have the practical effect of removing the option for the user to perform this type of query. This situation is very common. Many Enterprise search queries need, at least first, to perform a search against information (e.g., metadata) "related" to the contents (e.g., files) of the file system.

Beyond the benefits related to ease of performing queries, using an optimized view (e.g., file system 106) as described herein can greatly improve the speed and overhead of the indexing process. For a typical Enterprise including a mix of file sizes, file system 106 (the optimized view) can be about $\frac{1}{1000}$ the size of file system 103 (the original file system). Accordingly, file system 106 need not consume an exorbitant amount of storage capacity and corresponding processing resources.

There is another benefit of using an optimized view as described herein. For example, such a technique can be used to strike a more flexible balance between information security and ease of information access. As described, the view configuration information 104 as illustrated in FIG. 2 can be used to create a view that has sufficient information to support many forms of useful searching in the Enterprise environment. In addition, this view and any query results can contain much less confidential and sensitive information than the original file system 106. This can help reduce security concerns related to indexes, which are currently getting increased attention.

Search applications for desktops are sometimes available as no cost downloads from companies such as Google™, Microsoft™, and Yahoo™. This availability, combined with the real need for a better solution to efficiently locate information, has motivated many Enterprise employees to index file systems containing sensitive Enterprise information on their portable computers. Unfortunately, portable computers can be stolen. This allows inappropriate parties to gain access to sensitive information.

One solution to this problem is to implement the embodiments herein to create views that contain low levels of sensitive information, but which when used in conjunction with a search application, help authorized users to find the information they need to efficiently perform their jobs. This disclosure includes an observation that the information that helps authorized users to efficiently find information is often metadata that by itself is not very sensitive in nature.

For example, an authorized user may need to be reminded of a filename that they were working on last week. A simple query that returns just the names of all the files modified by the specific user over the last week would greatly help in this case. This query does not require any of the actual data to be indexed. This same approach could be used to allow "safe" web server access to perform searches even when the web server supports a lower-level of access control security compared to network file systems.

Note that any or all of the data (e.g., file system 103 and file system 106) maintained by respective server 119 and server 112 can be maintained in a "classical" file system type of environment or a database type environment (in which the database appears as a file system rendered on the fly in view of the applications). Thus, either or both of file system 103 and file system 106 can be stored in a database as records of information as well.

Figure 6:
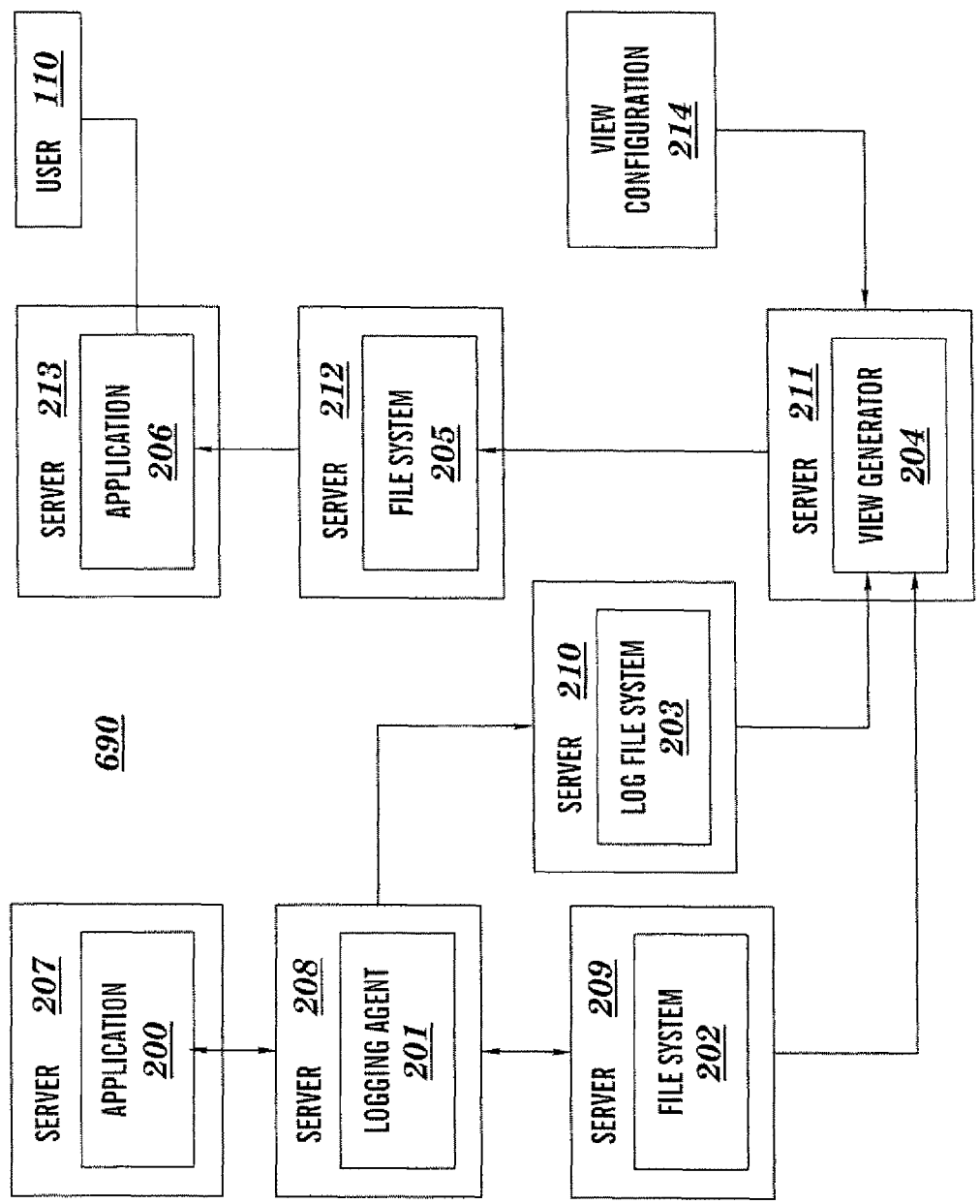
FIG. 6 is a diagram of a storage management system including a logging agent according to embodiments herein.

FIG. 6 is an example diagram of a file management system 690 including a log file functionality according to embodiments herein. As shown, file management system 690 includes server 207 for executing application 200, server 208 for executing logging agent 201, server 209 for managing file system 202, server 210 for executing log file system 203, server 211 for executing view generator function 204, server 212 for managing file system 205, and server 213 for executing application 206.

In general, in addition to the components as discussed above for FIG. 1, FIG. 6 includes log agent 201 executing on server 208 and a log file system 203 (e.g., a logging function) executing on server 210. Application 200 initiates changes to contents of file system 202. Logging agent 201 manages the changes to file system 202 and notifies log file system 203 of any changes. Log file system 203 logs the changes.

Based on application of view configuration information 214 (in a similar way as discussed above for FIG. 1), view generator function 204 updates file system 205 in accordance with the changes as specified by the log file system 203. Server 213 can support application 206 such as a search engine enabling user 110 to submit search criteria that are applied to file system 205 for purposes of identifying files in file system 202 having certain characteristics. Master file system 202 can include all of the information typically associated with a standard file system, while file system 205 can provide an optimized view that supports efficient searching as discussed above. Accordingly, one embodiment herein includes logging occurrence of file operations associated with the multiple files stored in file system 202 (in a primary repository), and initiating modification of the file system 205 (in a secondary repository) in accordance with the logged file operations such that search inquiries applied to the file system 205 yield corresponding search results reflecting a current state of the file system 202 including application of the file operations to the multiple files in the file system 202. In other words, the logging agent 201 can identify changes to file system 202. The view generator function 204 can initiate updating file system 205 based on the changes as specified by log information in log file system 203.

More particularly, file management system 690 in FIG. 6 utilizes a logging agent 201 to provide a log of file system operations. Logged operations specify how the content in file system 202 has been modified over time. As will be discussed, the log operations can be used by the view generator function 204 to update a "view" file system 205 in a more efficient way than by initiating a complete re-scan of the master file system 202 to produce file system 205. Additionally, the log operations according to embodiments herein can include a wide variety of additional detailed information that can be used to produce corresponding metadata for storage in file system 205.

While FIG. 6 illustrates a logging server as a logging agent 201 running on dedicated server 208, the logging agent functionality as shown in FIG. 6 can be implemented in one or more locations such as in application 200, on server 207, in a file system or network stack, in a network switch like an Acopia ARX, on file server 209, etc. An example of such a network switch (e.g., an Acopia ARX switch) is discussed in co-pending US Patent Application entitled "METHOD AND APPARATUS FOR ADAPTIVE SERVICES NETWORKING" filed Jan. 13, 2004, having U.S. Ser. No. 10/756,189. This utility Patent Application claims the benefit of the filing date of the following earlier filed U.S. Provisional Patent Applications: 1) "METHODS AND APPARATUS FOR ADAPTIVE SERVICES NETWORKING" filed Jan. 13, 2003 having U.S. Ser. No. 60/439,763; and 2) "METHODS AND APPARATUS FOR INSERTING A FILE SERVER LOAD BALANCING DEVICE INTO A NETWORK" filed Aug. 28, 2003 having U.S. Ser. No. 60/498,475. The entire teachings and contents of these referenced Applications are hereby incorporated herein by reference in their entirety.

Figure 9:
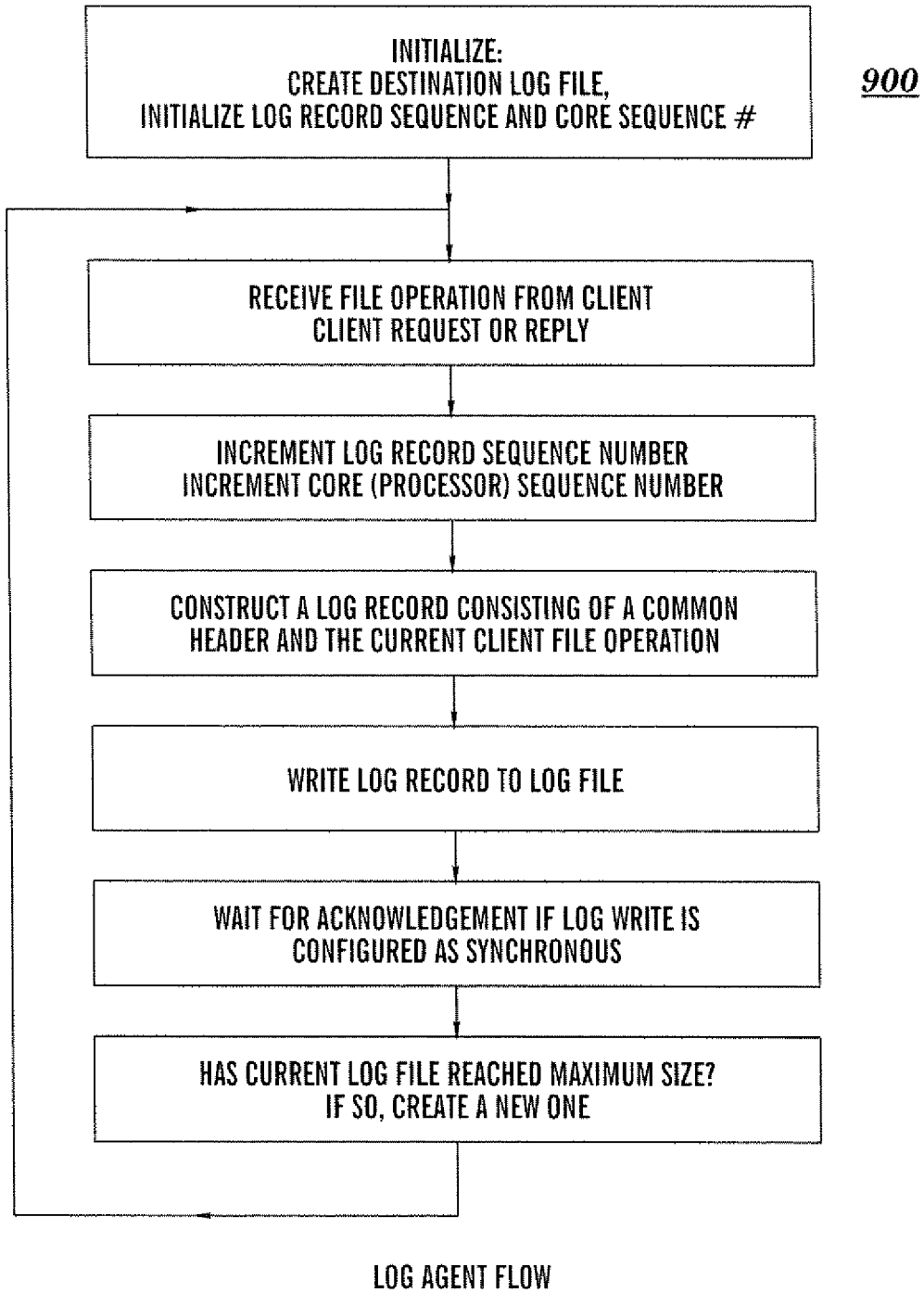
FIG. 9 is an example flowchart associated with a log agent illustrating generation of a log file according to embodiments herein.

In one embodiment, the logging agent functionality is provided by the logging service (acting as logging agent 201) on server 208 (e.g., a Network Service Module) in an Acopia ARX switch. This type of implementation provides high-performance and high reliability. A representative flow diagram (e.g., flowchart 900) associated with logging agent 201 is shown in FIG. 9.

Logging agent 201 can be configured to write a record (or records) to the appropriate log file in log file system 203 in accordance with file system operations (e.g., reads read operation writes) applied to file system 202. A record in log file system 203 can contain detailed information about each file operation performed with respect to file system 202.

Figure 7:
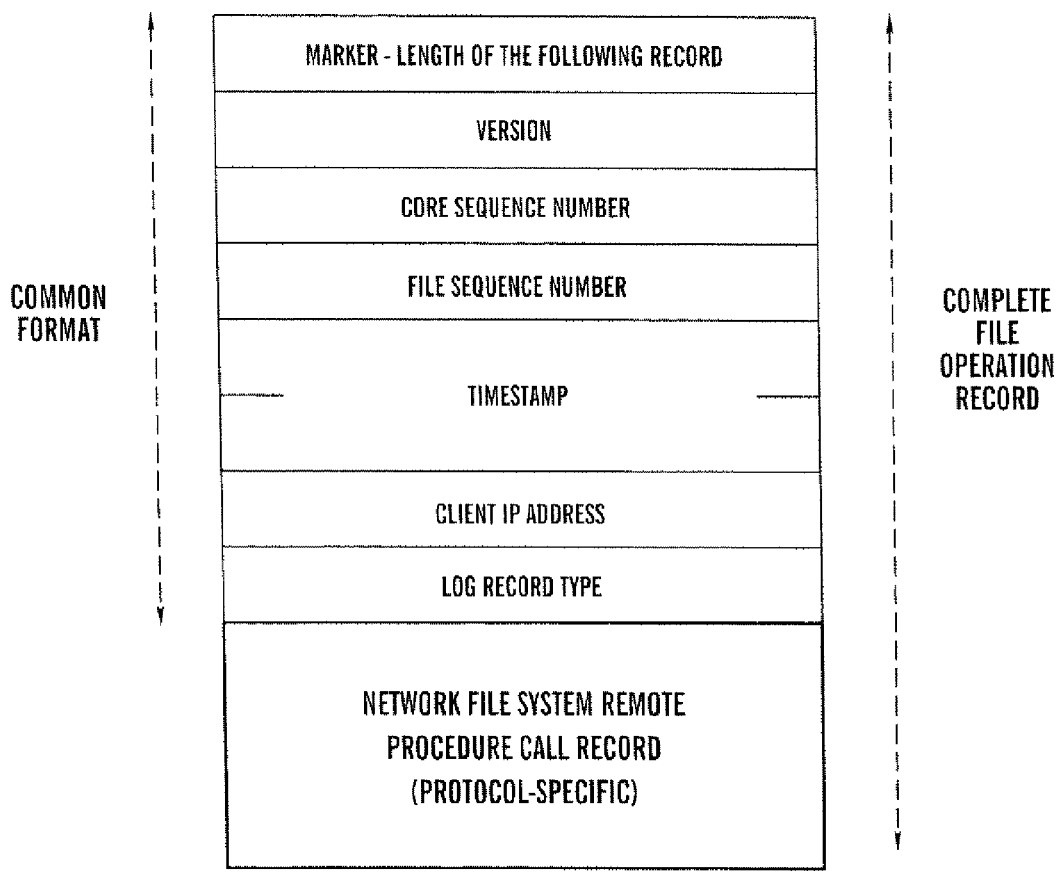
FIG. 7 is a diagram illustrating an example record format for file operation logging according to embodiments herein.

A suitable record format 725 for storing information (e.g., via records) in log file system 203 is shown in FIG. 7. The format 725 of the protocol specific portion of the record is defined by the appropriate network file system specification. In the case of NFS version 3, the document entitled "RFC 1813—NFS Version 3 Protocol Specification" defines the format of all file system operations. As an example, FIG. 8 contains the detailed description of an NFS Create remote procedure call 825 extracted from this specification.

Similar to the embodiments as discussed above with respect to FIG. 1, during initialization (e.g., creation of file system 205), view generator 204 scans file system 202 in its entirety and creates a corresponding file system 205 as defined by view configuration 214. After initialization, the view generator function 204 periodically reads the log files (e.g., records) stored in log file system 203.

Figure 10:
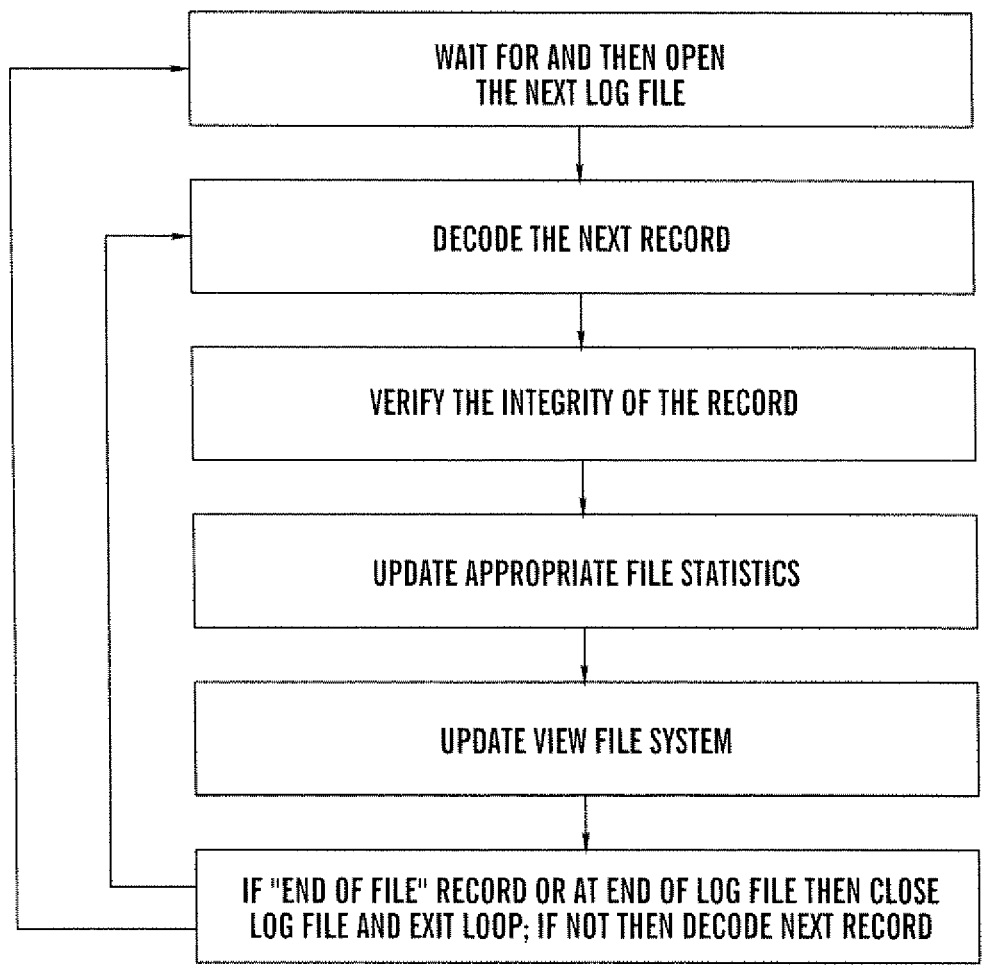
FIG. 10 is an example flowchart for processing a file operation log according to embodiments herein.

FIG. 10 is a diagram of a flowchart 1000 executed by view generator function 204 for decoding log files in log file system 203 and updating file system 205 according to embodiments herein.

As previously mentioned, log-based updating of file system 205 has two benefits. First, log-based updating of file system 205 saves the overhead and latency of performing a complete scan of file system 202 again each time there is a change to the master file system 202. Second, log-based updating of file system 205 provides the raw information that can be used to generate almost any kind of file system statistic. These statistics can then be represented as strings within the files stored in file system 205. In as similar vein as the view configuration information 104 in FIG. 2, FIGS. 11 and 12 include respective view configuration information 1120 and view configuration information 1220 defining a variety of tags to be generated (for inclusion in file system 205) based on processing of the records in the log file system 203.

Note that there may be some situations in which the files and directories within a view file system (e.g., file system 205) do not have a one-to-one relationship with the original file system 202. Consider the case in which the delete or rename tags described in FIG. 12 are included in the view configuration. A delete or rename file operation will cause the removal of a file from the original file system 602. If the view file system 205 retains the information associated with the deleted file for some amount of time (for example 6 months) after they are deleted or renamed in the original file system 202, then these tags can be written to files in the view file system 205, which correspond to the deleted or renamed files in the original file system 202. In this way, applications and users can perform queries such as "show me all of files deleted by user John Smith over the last month" (USERNAME: John_Smith and DELETED:Lessthan1Month).

In one embodiment, the view file system 205 could assist a user 110 in a file recovery operation by including a "restore" tag that contains the location(s) in an archive or backup system of a backup copy of the deleted file. FIG. 13 shows an example of metadata information 1325 stored in a view file system 205 for a deleted file. As mentioned, retaining this information (e.g., metadata information 1325) even after a corresponding file (e.g., patent_application_001tmp.doc) in file system 202 has been deleted can be useful for certain types of searches requesting a view of operations applied to a file that currently is or was stored in the master file system 202. Any of this information can be used for searching purposes. For example, a user 110 can provide search criteria with files in file system 202 having specific corresponding metadata that matches or satisfies the search criteria.

Accordingly, embodiments herein can include logging occurrence of file operations applied to one or more of the multiple files stored in file system 202 (e.g., a primary repository); initiating storage of modification information as searchable parameters in the file system 205 (e.g., a secondary repository) in accordance with the logged file operations stored in log file system 203; and enabling application of searches to the storage modification information in the file system 205 to search for files in file system 202 based on operations applied to the multiple files in file system 202.

Figure 14:
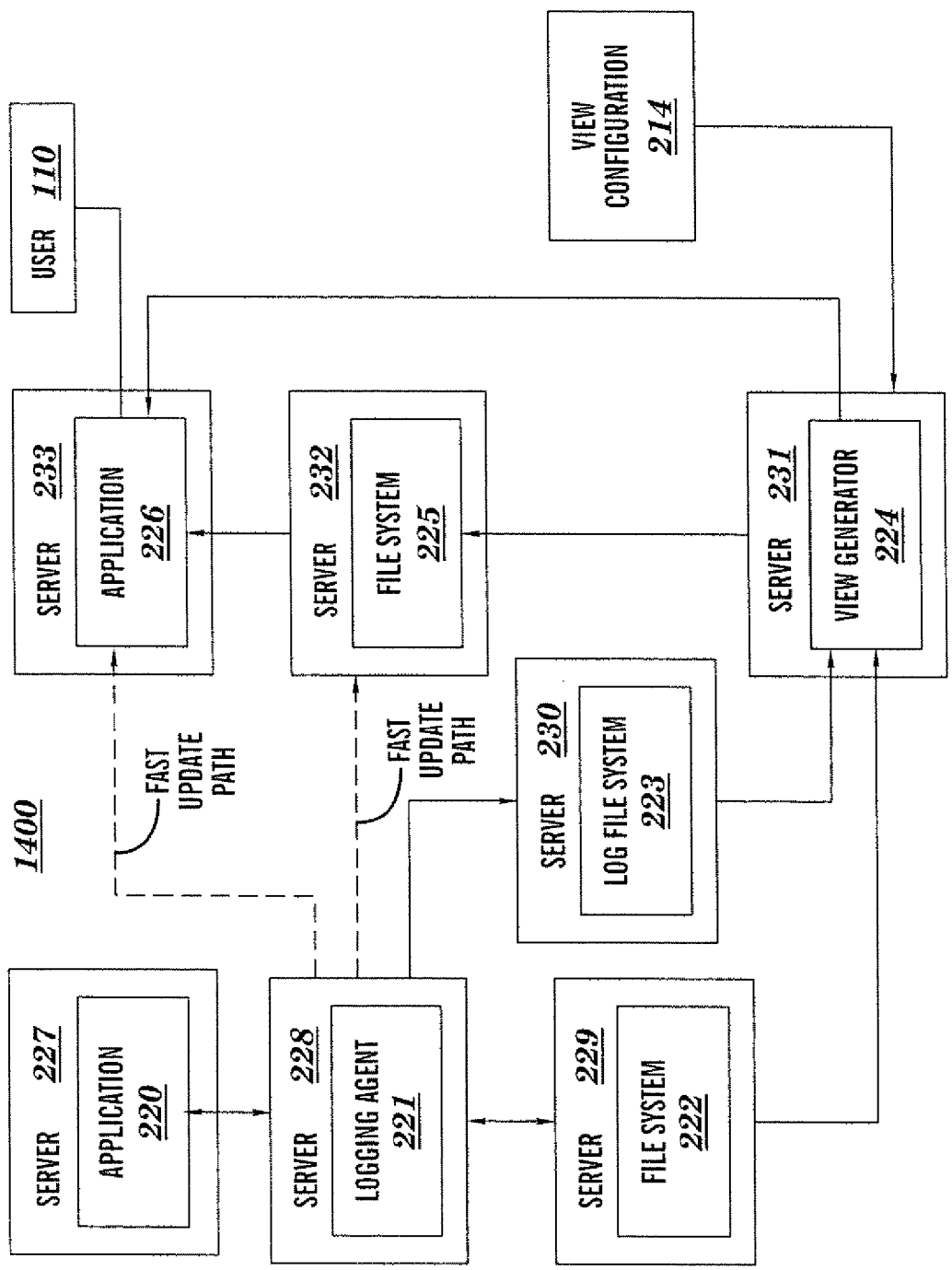
FIG. 14 is a diagram illustrating an example storage management system according to embodiments herein.

FIG. 14 is a diagram of file management system 1400 according to embodiments herein. This embodiment is similar to the file management systems as previously discussed, but this embodiment adds an incremental update path between view generator function 224 and file system 225. This update path can greatly reduce the time delay between a change in file system 222 and the reflection of that change at application 226. If application 226 is a search application as described in the embodiment of FIG. 1, then the benefit of including the update path(s) is that the index is updated in almost real-time (typically in the order of seconds) compared with hours for approaches that require full-scanning of the original file system with a large number of files. An additional benefit is that the file operation load on file system 222 and corresponding file server 229 related to supporting file system 225 drops to zero, except for the initialization phase that occurs when the view is first established. As mentioned, file system 225 can be created based on an initial full scan of file system 222 and application of corresponding view configuration information 214. Servers 227 including application 220, 228, 229, 230 including log file system 223, 231, 232, and 233 shown in FIG. 14 are same as servers 207, 208, 209, 210, 211, 212, and 213, respectively, shown in FIG. 6.

FIG. 15 includes a sample program 1510 (e.g., software code such as that provided by Google™) that can be used to implement an update transaction between view generator 224 and application 226. In one embodiment, application 226 is a Google Search™ application running on a Google Search™ appliance. A similar program could be written by one skilled in the art to support other applications that natively support incremental updates.

A variation of this embodiment supports a direct update path from logging agent 221 to application 226 or to file system 225. This embodiment could support a synchronous update to application 226, which can be useful for compliance and data protection related applications. This variation may require some functionality associated with view generator function 224 be moved to the logging agent 221. The moved functionality permits the logging agent 221 to convert a log record directly into an update operation for sending directly to the application 226 or file system 225. Accordingly, logging agent 221 can provide one or more fast update paths so that file system 222 and file system 225 are automatically synchronized in real-time or near real-time. Accordingly, embodiments herein include enabling a logging function (e.g., logging agent 221) that keeps track of changes to the primary repository (e.g., file system 221) to convert stored records (e.g., records of file system operations performed on file system 222) into update operations for modifying the secondary repository (e.g., file system 225 optimized for searching) such that the file system 222 and the file system 225 are automatically synchronized with each other in substantially real-time.

Figure 16:
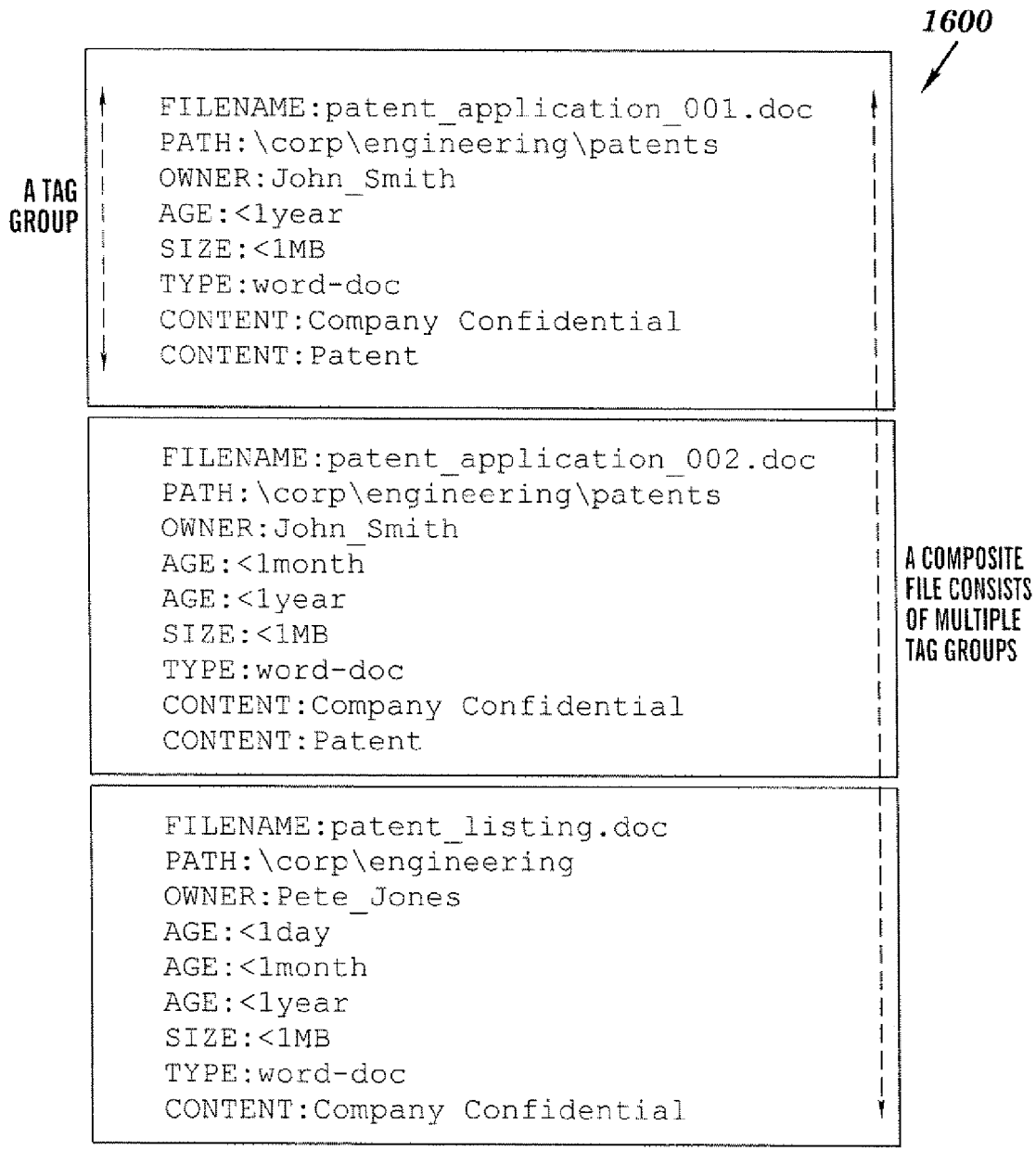
FIG. 16 is a diagram of an example composite file including multiple tag groups according to embodiments herein.

FIG. 16 is a diagram of an example composite file 1600 according to embodiments herein. Composite files 1600 can be used to scale search applications (e.g., application 226) to much higher file counts. In this embodiment, the files presented in the view (e.g., file system 225) optimized for a search application are not mapped in a one-to-one manner to the files in the original file system 222. Contents of file system 225 are instead presented as composite files 1600 in which the tags corresponding to the multiple files are stored in a single file of the view file system (e.g., file system 225).

As an example, assume that a search application (e.g., application 226) has a limit of 1 million files. This search application is presented in a file system view (e.g., file system 225) in which each file contains tag-based descriptions (a "tag group") for 100 of the original files in file system 222. These composite files 1600 can store the entire tag description for a file system 222 with 100M (e.g., 100 million) files in 1M (e.g., 1 million) composite files 1600 of file system 225. In this environment, the unmodified search application (e.g., application 226) is now able to search across the tag descriptions of 100×1M or 100M files. Thus, the limitation has been removed. Accordingly, one embodiment herein includes producing file system 225 at the server 232 (e.g., a repository) to include one or more composite files 1600, each of which includes groupings of metadata information associated with multiple corresponding files in the file system 222 (e.g., a repository); receiving a search request from a source such as user 110; and utilizing the one or more composite files 1600 in the file system 225 at server 232 to identify multiple files in the master file system 222 that satisfy the search request.

Figure 17:
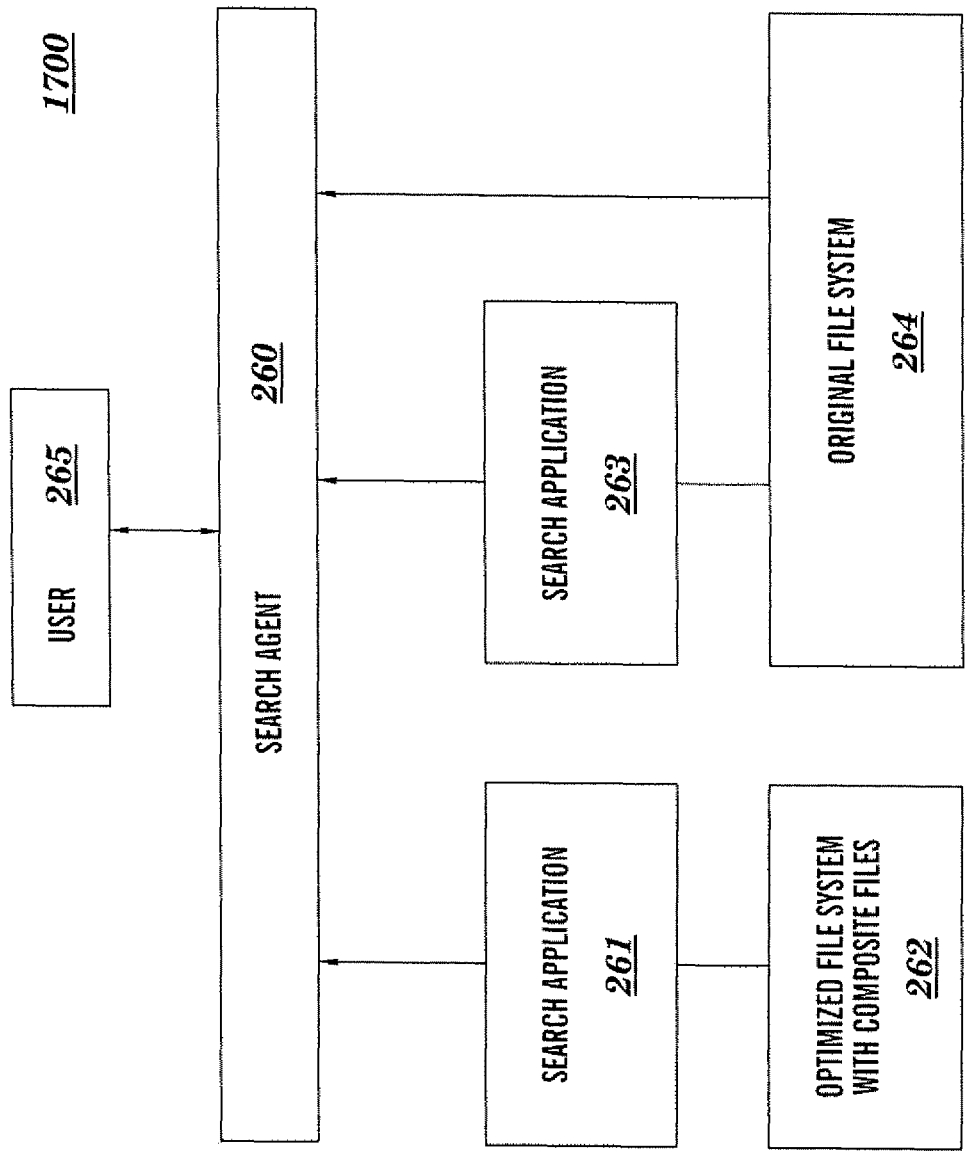
FIG. 17 is a diagram illustrating scaling of a file count limit of a search application according to embodiments herein.

FIG. 17 is a diagram of a management system 1700 that scales the file count capability of a search application according to embodiments herein. User 265 connects to search agent 260 using an interface such as a web browser. Search agent 260 presents the user 260 with a simple query screen similar to that illustrated in FIG. 4. User 265 can perform queries by using the tags defined in the view configuration information used to derive file system 262 in a manner as previously discussed. In response to a query request from user 265, search agent 260 forwards the query to search application 261. Search application 261 responds to the query by returning any matches it finds to content of the files stored in file system 262. In other words, the search application 261 responds to a search inquiry by identifying files in file system 262 (e.g., the optimized view) that satisfy the search parameters in the search inquiry.

File system 262 can be derived from file system 264 and include the composite file approach as illustrated in FIG. 16. Due to the composite nature of the files in file system 262, the query results returned by search application 261 must be processed prior to presentation to user 265. For example, search agent 260 processes each match in the response by first fetching the entire contents of a composite file in file system 262 that matches. This composite file is then searched tag group by tag group for a match against the query criteria. On a match of a tag group, a response record, which includes the name of the file as stored in the FILENAME tag is generated (this corresponds to the name of the file in file system 264). When all matches have been found and response records generated or the number of matches exceeds the maximum number of match results that will be returned on a query, then the records are assembled into a single response that is then returned to user 265. Accordingly, embodiments herein include receiving a search request; fetching a composite file 1600; comparing search criteria in the search request to each group of metadata in the composite file 1600; and for each respective group of metadata in the composite file 1600 that matches the search criteria, including a corresponding file name of a corresponding file in the file system 264 for inclusion in a reply to the search request.

It is entirely possible that a composite file that matches against the query will not yield any matches at the tag group (individual file level). For example, consider a query consisting of "SIZE:<1 MB and TYPE:word-doc". It is entirely possible that a tag group within a given composite file would match on SIZE:<1 MB and another tag group would match on TYPE:word-doc but no single tag group would contain both desired tags. This condition will result in a match from the search application. Search agent 260 handles this condition by treating the lack of any matches on its tag-group check for a given composite file to be an acceptable result.

User 265 can use the embodiment illustrated in FIG. 17 to implement a two-tiered search (or search agent 260 could be modified to hide the existence of the two tiers from the user). To perform a two-tier search, user 265 would first perform a fast search based on the contents of file system 262. Then these results would be used to either query the complete content index maintained by application 263 of the original file system 264 or to perform the second search directly against the contents of the specified files in file system 264. The performance of the latter approach can be reasonable if the first search results represent a modest number of files that actually must be searched in file system 264. Accordingly, embodiments herein enable a multi-tiered search capability including: i) a first search applied to the file system 262 to identify a group of files in the file system 264; and ii) a second search that utilizes results of the first search to apply to the file system 264 and identify the files match both search criteria.

Another option is to index a view, which consists of the tags and all the content from the original file system 264 (this is illustrated as DATA option of FIG. 2). This index would be larger than the index for the original file system 264 but it would have the ability to perform any combination of tag and content match queries.

Figure 18:
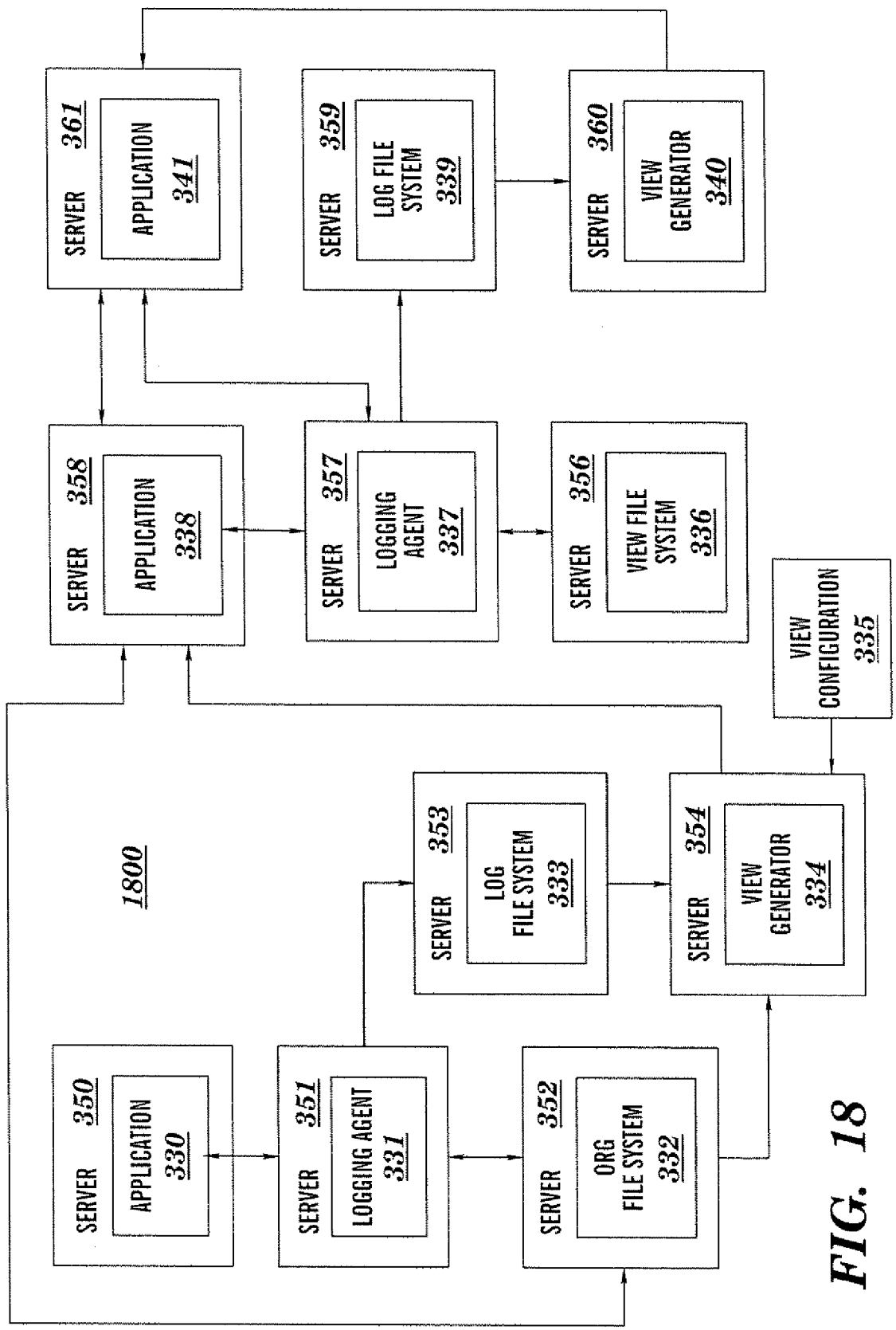
FIG. 18 is a diagram illustrating an example storage management system according to embodiments herein.

FIG. 18 illustrates a system 1800 that adds the ability of an application to modify (write) the contents of a file in the view file system 336 (stored on server 356) as a way to add tags beyond those generated by the view generator according to embodiments herein. These tags act as flexible extended metadata at the granularity of a file and can be used to influence the behavior of other applications. In FIG. 18, application 330 (stored on server 350), logging agent 331 (stored on server 351), original file system 332 (stored on server 352), log file system 333 (stored on server 353), and view generator 334 (stored on server 354) behave as previously described for FIG. 14. Application 338 (stored on server 358) reads from view file system 336 and, if needed, original file system 332. If application 338 finds a condition of interest, it can generate a tag identifying this condition and write it into the appropriate file or files in view file system 336. The write by application 338 is logged by logging agent 337 (stored on server 357) to log file system 339 (stored on server 359). In turn, view generator 340 (stored on server 360) monitors log file 339 and when it detects there has been a modify-type operation to view file system 336, it notifies application 341 of this modification. Application 341 (stored on server 361) can now take action based on this modification. This action can include an interaction with application 338. View configuration information 335 is configured same as view configuration information 214 of FIG. 14, details of which will not be repeated here.

As an example, application 336 is an advanced content classification application that can classify a file based on a sophisticated analysis of the contents of the file. This application runs various algorithms to determine if a file contains highly-sensitive information. Based on its on-going analysis, application 338 can continually add and remove tags from files in view file system 336. In turn application 341, which in this example is a file placement application contained within an Acopia ARX switch, can take the actions related to these tags. In the case that a file in file system 103 contains highly-sensitive information and has been tagged "highly-sensitive" in view file system 336, application 341 can transparently migrate the file to a storage unit that stores all data in encrypted form. Application 341 can then optionally write a tag ("STORAGE_TYPE:encrypted") to file system 336 that indicates that the corresponding file is now stored on encrypted storage. In turn, these tags can be read by application 338 to determine when a file classified as "highly-sensitive" has been successfully migrated to encrypted storage. Accordingly, sources other than view generator function 334 can provide metadata information for storage in view file system 336.

Another advantage of this approach is that metadata contained within existing applications such as an Enterprise Content Management (ECM) application can be exported into a view file system. As an example, in FIG. 15, application 338 is an ECM application (example: Documentum from EMM corporation) and it maintains large amounts of metadata related to files it manages within internal databases. Application 338 can export this metadata in the form of tags written to view file system 336. In this way, the metadata from application 338 is now available for general use by other applications. Accordingly, this is yet another example of how sources other than a view generator function can provide metadata information for storage in view file system 336.

FIG. 19 is a block diagram illustrating an example computer system 380 (e.g., a server as discussed above) for executing the functionality and other processes according to embodiments herein. Computer system 380 may be a computerized device such as a personal computer, workstation, portable computing device, console, network terminal, processing device, etc.

As shown, computer system 380 of the present example includes an interconnect 311 that couples a memory system 312, a processor 313, an I/O interface 314, and a communications interface 315. I/O interface 314 enables computer system 380 to receive input from peripheral devices 316 and display screen 317 (if computer system 380 is so equipped). Communications interface 315 of computer system 310 enables computer system 380 to communicate over network 390 or other connection to transmit information to and receive information from different resources such as other servers.

As shown, memory system 312 is encoded with view generator application 105-1 supporting creation and management of file system 106. View generator application 105-1 can be embodied as software code such as data and/or logic instructions (e.g., code stored in the memory or on another computer readable medium such as a disk) that support functionality according to different embodiments described herein.

During operation of view generator application 105-1, processor 313 accesses memory system 312 via the interconnect 311 in order to launch, run, execute, interpret or otherwise perform the logic instructions of the view generator application 105-1. Execution of the view generator application 105-1 produces processing functionality in view generator process 105-2. In other words, the view generator process 105-2 represents one or more portions of the view generator application 105-1 (or the entire application) performing within or upon the processor 313 in the computer system 380.

It should be noted that view generator process 105-2 executed in computer system 380 (e.g., server 111, server 211, server 229, server 354, etc.) can be represented by either one or both of the view generator application 105-1 and/or the view generator process 105-2. For purposes of the above discussion and different embodiments herein, general reference has been made to view generator function 105 as performing or supporting the various steps and functional operations as previously discussed.

As mentioned, in addition to the view generator process 105-2, embodiments herein include the view generator application 105-1 itself (i.e., the un-executed or non-performing logic instructions and/or data). The view generator application 105-1 may be stored on a computer readable medium such as a floppy disk, hard disk, or optical medium. The view generator application 105-1 may also be stored in a memory type system such as in firmware, read only memory (ROM), or, as in this example, as executable code within the memory system 312 (e.g., within Random Access Memory or RAM). In addition to these embodiments, it should also be noted that other embodiments herein include the execution of view generator application 105-1 in processor 313 as the view generator process 105-2. Thus, those skilled in the art will understand that the computer system 380 may include other processes and/or software and hardware components, such as an operating system that controls allocation and use of hardware resources.

As discussed above, techniques herein are well suited for use in applications such as those that support management of stored information. However, it should be noted that configurations herein are not limited to such use and thus configurations herein and deviations thereof are well suited for use in other environments as well.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A method comprising:
   maintaining a primary repository to store multiple files and metadata information associated with the multiple files;
   receiving template information specifying types of the metadata information associated with the multiple files stored in the primary repository; and
   applying the template information to the metadata information in the primary repository to produce a secondary repository of information comprising one or more metadata files with a subset of the metadata information, the metadata files having filenames comprising at least filenames of the corresponding multiple files in the primary repository; and
   receiving a search inquiry, utilizing a hierarchical file system in the secondary repository of information to perform a search, and identifying at least one of the multiple files in a hierarchical file system of the primary repository that satisfies the search inquiry based at least in part on at least a partial match of the filename of at least one corresponding metadata file.

2. A method as in claim 1, wherein applying the template information to the metadata information in the primary repository includes replicating the metadata information as specified by the template information for inclusion in the secondary repository.

3. A method as in claim 1 further comprising:
   in response to receiving search criteria, utilizing the secondary repository of information to produce a reference to a corresponding file in the primary repository that has associated metadata satisfying the search criteria.

4. A method as in claim 1 further comprising:
maintaining the primary repository to include a first hierarchical tree structure for storing the multiple files and keeping track of corresponding metadata associated with the multiple files;
maintaining the secondary repository of information to include a second hierarchical tree structure based upon the first hierarchical tree structure; and
utilizing the template information to identify what, if any, portion of the multiple files and the corresponding metadata in the first hierarchical tree structure to include in the second hierarchical tree structure.

5. A method as in claim 1 further comprising:
based on application of the template information to a respective file in the primary repository, replicating a portion of the respective file in the primary repository for inclusion in the secondary repository.

6. A method as in claim 1, wherein applying the template information to the metadata information in the primary repository includes:
retrieving a given file from a file system in the primary repository;
based on a text string as specified in the template information, searching for instances of the text string in the given file; and
in response to detecting an instance of the text string in the file, maintaining the secondary repository of information to include an indication that the file includes at least one instance of the text string.

7. A method as in claim 1 further comprising:
for a given file of the multiple files in the primary repository, creating a corresponding view file of metadata information associated with the given file based on metadata information in the primary repository associated with the given file; and
storing the corresponding view file in the secondary repository, the corresponding view file having same filename and filepath information as the given file in the first repository.

8. A method as in claim 1, wherein applying the template information includes:
based on processing of the template information, identifying selection of path information as a parameter associated with a given file in the primary repository to copy to the secondary repository; and
replicating identified path information associated with the given file from the primary repository to the secondary repository.

9. A method as in claim 1 further comprising:
logging occurrence of file operations associated with the multiple files stored in a file system of the primary repository; and
initiating modification of the secondary repository in accordance with the logged file operations such that search inquiries applied to the secondary repository yield corresponding search results reflecting a current state of the primary repository including application of the file operations to the multiple files in the primary repository.

10. A method as in claim 1 further comprising:
logging occurrence of file operations applied to the multiple files stored in a file system of the primary repository;
initiating storage of modification information as searchable parameters in the secondary repository in accordance with the file operations; and
activating application of searches to the storage modification information in the second repository to search for files in the primary repository based on operations applied to the multiple files in the primary repository.

11. A method as in claim 1 further comprising:
activating a logging function that keeps track of changes to the primary repository to convert stored records into update operations for modifying the secondary repository such that the primary repository and the secondary repository are automatically synchronized with each other in real-time.

12. A method as in claim 1 further comprising:
producing a file system in the secondary repository to include a composite file including groups of metadata information associated with multiple corresponding files in the primary repository;
receiving a search request; and
utilizing the composite file in the file system of the secondary repository to identify multiple files in the primary repository that satisfy the search request.

13. A method as in claim 1 further comprising:
producing a file system in the secondary repository to include a composite file including groups of metadata information, each group of metadata information being associated with a corresponding file in the primary repository;
receiving a search request;
fetching the composite file;
comparing search criteria in the search request to each group of metadata in the composite file; and
for each respective group of metadata that matches the search criteria, including a corresponding file name of a corresponding file in the primary repository for inclusion in a reply to the search request.

14. A method as in claim 1 further comprising:
activating a multi-tiered search including: i) a first search applied to the secondary repository to identify a group of files in the primary repository; and ii) a second search that utilizes results of the first search to apply to the primary repository and identify a subset of the identified group of files.

15. An apparatus comprising:
at least one processor; and
memory coupled to the at least one processor which is configured to execute program instructions stored in the memory comprising:
maintaining a primary repository to store multiple files and metadata information associated with the multiple files;
receiving template information specifying types of the metadata information associated with the multiple files stored in the primary repository;
applying the template information to the metadata information in the primary repository to produce a secondary repository of information comprising one or more metadata files with a subset of the metadata information, the metadata files having filenames comprising at least filenames of the corresponding multiple files in the primary repository; and
receiving a search inquiry, utilizing a hierarchical file system in the secondary repository of information to perform a search, and identifying at least one of the multiple files in a hierarchical file system of the primary repository that satisfies the search inquiry based at least in part on at least a partial match of the filename of at least one corresponding metadata file.

16. An apparatus as in claim 15, wherein applying the template information to the metadata information in the primary repository includes replicating metadata information as specified by the template information for inclusion in the secondary repository.

17. An apparatus as in claim 15 wherein the at least one processor is further configured to execute programmed instructions stored in the memory further comprising:
  in response to receiving search criteria, utilizing the secondary repository of information to produce a reference to a corresponding file in the primary repository that has associated metadata satisfying the search criteria.

18. An apparatus as in claim 15 wherein the at least one processor is further configured to execute programmed instructions stored in the memory further comprising:
  maintaining the primary repository to include a first hierarchical tree structure for storing the multiple files and keeping track of corresponding metadata associated with the multiple files;
  maintaining the secondary repository of information to include a second hierarchical tree structure based upon the first hierarchical tree structure; and
  utilizing the template information to identify what, if any, portion of the multiple files and the corresponding metadata in the first hierarchical tree structure to include in the second hierarchical tree structure.

19. An apparatus as in claim 15, wherein applying the template information to the metadata information in the primary repository includes:
  retrieving a given file from a file system in the primary repository;
  based on a text string as specified in the template information, searching for instances of the text string in the given file; and
  in response to detecting an instance of the text string in the file, maintaining the secondary repository of information to include an indication that the file includes at least one instance of the text string.

20. An apparatus as in claim 15, wherein applying the template information includes:
  based on processing of the template information, identifying selection of path information as a parameter associated with a given file in the primary repository to copy to the secondary repository; and
  replicating identified path information associated with the given file from the primary repository to the secondary repository.

21. An apparatus as in claim 15 wherein the at least one processor is further configured to execute programmed instructions stored in the memory further comprising:
  logging occurrence of file operations associated with the multiple files stored in a file system of the primary repository; and
  initiating modification of the secondary repository in accordance with the logged file operations such that search inquiries applied to the secondary repository yield corresponding search results reflecting a current state of the primary repository including application of the file operations to the multiple files in the primary repository.

22. An apparatus as in claim 15 wherein the at least one processor is further configured to execute programmed instructions stored in the memory further comprising:
  logging occurrence of file operations applied to the multiple files stored in a file system of the primary repository;
  initiating storage of modification information as searchable parameters in the secondary repository in accordance with the file operations; and
  enabling application of searches to the storage modification information in the second repository to search for files in primary repository based on operations applied to the multiple files in the primary repository.

23. An apparatus as in claim 15 wherein the at least one processor is further configured to execute programmed instructions stored in the memory further comprising:
  enabling a logging function that keeps track of changes to the primary repository to convert stored records into update operations for modifying the secondary repository such that the primary repository and the secondary repository are automatically synchronized with each other in real-time.

24. An apparatus as in claim 15 wherein the at least one processor is further configured to execute programmed instructions stored in the memory further comprising:
  producing a file system in the secondary repository to include a composite file including groups of metadata information associated with multiple corresponding files in the primary repository;
  receiving a search request; and
  utilizing the composite file in the file system of the secondary repository to identify multiple files in the primary repository that satisfy the search request.

25. An apparatus as in claim 15 wherein the at least one processor is further configured to execute programmed instructions stored in the memory further comprising:
  producing a file system in the secondary repository to include a composite file including groups of metadata information, each group of metadata information being associated with a corresponding file in the primary repository;
  receiving a search request;
  fetching the composite file;
  comparing search criteria in the search request to each group of metadata in the composite file; and
  for each respective group of metadata that matches the search criteria, including a corresponding file name of a corresponding file in the primary repository for inclusion in a reply to the search request.

26. An apparatus as in claim 15 wherein the at least one processor is further configured to execute programmed instructions stored in the memory further comprising, based on application of the template information to a respective file in the primary repository, replicating a portion of the respective file in the primary repository for inclusion in the secondary repository.

27. An apparatus as in claim 15 wherein the at least one processor is further configured to execute programmed instructions stored in the memory further comprising:
  for a given file of the multiple files in the primary repository, creating a corresponding view file of metadata information associated with the given file based on metadata information in the primary repository associated with the given file; and
  storing the corresponding view file in the secondary repository, the corresponding view file having same filename and filepath information as the given file in the first repository.

28. An apparatus as in claim 15 wherein the at least one processor is further configured to execute programmed instructions stored in the memory further comprising activating a multi-tiered search including: i) a first search applied to the secondary repository to identify a group of files in the primary repository; and ii) a second search that utilizes results of the first search to apply to the primary repository and identify a subset of the identified group of files.

29. A non-transitory computer readable medium having stored thereon instructions comprising machine executable code which when executed by at least one processor, causes the processor to perform steps comprising:
   maintaining a primary repository to store multiple files and metadata information associated with the multiple files;
   receiving template information specifying types of the metadata information associated with the multiple files stored in the primary repository;
   applying the template information to the metadata information in the primary repository to produce a secondary repository of information comprising one or more metadata files with a subset of the metadata information, the metadata files having filenames comprising at least filenames of the corresponding multiple files in the primary repository; and
   receiving a search inquiry, utilizing a hierarchical file system in the secondary repository of information to perform a search, and identifying at least one of the multiple files in a hierarchical file system of the primary repository that satisfies the search inquiry based at least in part on at least a partial match of the filename of at least one corresponding metadata file.

30. A medium as in claim 29, wherein applying the template information to the metadata information in the primary repository includes replicating the metadata information as specified by the template information for inclusion in the secondary repository.

31. A medium as set forth in claim 29 further having stored thereon instructions that when executed by the processor causes the process to perform steps comprising, in response to receiving search criteria, utilizing the secondary repository of information to produce a reference to a corresponding file in the primary repository that has associated metadata satisfying the search criteria.

32. A medium as set forth in claim 29 further having stored thereon instructions that when executed by the processor causes the process to perform steps comprising:
   maintaining the primary repository to include a first hierarchical tree structure for storing the multiple files and keeping track of corresponding metadata associated with the multiple files;
   maintaining the secondary repository of information to include a second hierarchical tree structure based upon the first hierarchical tree structure; and
   utilizing the template information to identify what, if any, portion of the multiple files and the corresponding metadata in the first hierarchical tree structure to include in the second hierarchical tree structure.

33. A medium as set forth in claim 29 further having stored thereon instructions that when executed by the processor causes the process to perform steps comprising, based on application of the template information to a respective file in the primary repository, replicating a portion of the respective file in the primary repository for inclusion in the secondary repository.

34. A medium as set forth in claim 29, wherein applying the template information to the metadata information in the primary repository includes:
   retrieving a given file from a file system in the primary repository;
   based on a text string as specified in the template information, searching for instances of the text string in the given file; and
   in response to detecting an instance of the text string in the file, maintaining the secondary repository of information to include an indication that the file includes at least one instance of the text string.

35. A medium as set forth in claim 29 further having stored thereon instructions that when executed by the processor causes the process to perform steps comprising:
   for a given file of the multiple files in the primary repository, creating a corresponding view file of metadata information associated with the given file based on metadata information in the primary repository associated with the given file; and
   storing the corresponding view file in the secondary repository, the corresponding view file having same filename and filepath information as the given file in the first repository.

36. A medium as set forth in claim 29, wherein applying the template information includes:
   based on processing of the template information, identifying selection of path information as a parameter associated with a given file in the primary repository to copy to the secondary repository; and
   replicating identified path information associated with the given file from the primary repository to the secondary repository.

37. A medium as set forth in claim 29 further having stored thereon instructions that when executed by the processor causes the process to perform steps comprising:
   logging occurrence of file operations associated with the multiple files stored in a file system of the primary repository; and
   initiating modification of the secondary repository in accordance with the logged file operations such that search inquiries applied to the secondary repository yield corresponding search results reflecting a current state of the primary repository including application of the file operations to the multiple files in the primary repository.

38. A medium as set forth in claim 29 further having stored thereon instructions that when executed by the processor causes the process to perform steps comprising:
   logging occurrence of file operations applied to the multiple files stored in a file system of the primary repository;
   initiating storage of modification information as searchable parameters in the secondary repository in accordance with the file operations; and
   activating application of searches to the storage modification information in the second repository to search for files in the primary repository based on operations applied to the multiple files in the primary repository.

39. A medium as set forth in claim 29 further having stored thereon instructions that when executed by the processor causes the process to perform steps comprising activating a logging function that keeps track of changes to the primary repository to convert stored records into update operations for modifying the secondary repository such that the primary repository and the secondary repository are automatically synchronized with each other in real-time.

40. A medium as set forth in claim 29 further having stored thereon instructions that when executed by the processor causes the process to perform steps comprising:
   producing a file system in the secondary repository to include a composite file including groups of metadata information associated with multiple corresponding files in the primary repository;
   receiving a search request; and utilizing the composite file in the file system of the secondary repository to identify multiple files in the primary repository that satisfy the search request.

41. A medium as set forth in claim 29 further having stored thereon instructions that when executed by the processor causes the process to perform steps comprising:

producing a file system in the secondary repository to include a composite file including groups of metadata information, each group of metadata information being associated with a corresponding file in the primary repository;

receiving a search request;

fetching the composite file;

comparing search criteria in the search request to each group of metadata in the composite file; and for each respective group of metadata that matches the search criteria, including a corresponding file name of a corresponding file in the primary repository for inclusion in a reply to the search request.

42. A medium as set forth in claim 29 further having stored thereon instructions that when executed by the processor causes the process to perform steps comprising activating a multi-tiered search including: i) a first search applied to the secondary repository to identify a group of files in the primary repository; and ii) a second search that utilizes results of the first search to apply to the primary repository and identify a subset of the identified group of files.

* * * * *